United States Patent
Fukai et al.

(10) Patent No.: US 10,310,305 B2
(45) Date of Patent: Jun. 4, 2019

(54) LIQUID CRYSTAL DISPLAY DEVICE AND ELECTRONIC DEVICE

(71) Applicant: Semiconductor Energy Laboratory Co., Ltd., Kanagawa-ken (JP)

(72) Inventors: Shuji Fukai, Kanagawa (JP); Ryo Hatsumi, Kanagawa (JP); Daisuke Kubota, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 154 days.

(21) Appl. No.: 15/350,690

(22) Filed: Nov. 14, 2016

(65) Prior Publication Data

US 2017/0059910 A1 Mar. 2, 2017

Related U.S. Application Data

(63) Continuation of application No. 14/337,731, filed on Jul. 22, 2014, now Pat. No. 9,500,916.

(30) Foreign Application Priority Data

Jul. 25, 2013 (JP) .................. 2013-154170

(51) Int. Cl.
*G02F 1/1343* (2006.01)
*G02F 1/133* (2006.01)
(Continued)

(52) U.S. Cl.
CPC .... *G02F 1/13306* (2013.01); *G02F 1/133345* (2013.01); *G02F 1/134363* (2013.01);
(Continued)

(58) Field of Classification Search
CPC ................................ G02F 1/134363
(Continued)

(56) References Cited

U.S. PATENT DOCUMENTS 5,731,856 A 3/1998 Kim et al.
5,744,864 A 4/1998 Cillessen et al.
(Continued)

FOREIGN PATENT DOCUMENTS

CN 101539692 A 9/2009
CN 101750821 A 6/2010
(Continued)

OTHER PUBLICATIONS

Taiwan Office Action re Application No. TW 103123799, dated Jan. 18, 2018.
(Continued)

*Primary Examiner* — Calvin C Ma
(74) *Attorney, Agent, or Firm* — Husch Blackwell LLP

(57) ABSTRACT

A flicker of an FFS liquid crystal display device that is driven at a low refresh rate is reduced. In an FFS liquid crystal display, a pixel electrode and a first common electrode included in a liquid crystal element are formed on an element substrate side, and a second common electrode is formed on another substrate (counter substrate) side. By making the first and second common electrodes have the same potential, generation of a residual DC voltage can be suppressed in a pixel. Thus, even when a refresh rate is lowered, change in transmittance of a pixel can be suppressed in a data retention period, so that a flicker can be reduced.

16 Claims, 11 Drawing Sheets

(51) Int. Cl.
*G02F 1/1333* (2006.01)
*G09G 3/36* (2006.01)
*G02F 1/1335* (2006.01)
*G02F 1/1337* (2006.01)
*G02F 1/1339* (2006.01)
*G02F 1/1362* (2006.01)
*G02F 1/1368* (2006.01)

(52) U.S. Cl.
CPC ......... *G09G 3/3677* (2013.01); *G09G 3/3688* (2013.01); *G02F 1/1337* (2013.01); *G02F 1/1368* (2013.01); *G02F 1/13394* (2013.01); *G02F 1/133512* (2013.01); *G02F 1/133514* (2013.01); *G02F 1/136286* (2013.01); *G02F 2001/13629* (2013.01); *G02F 2001/133302* (2013.01); *G02F 2001/134372* (2013.01); *G02F 2001/134381* (2013.01); *G02F 2001/136295* (2013.01); *G02F 2201/121* (2013.01); *G02F 2201/123* (2013.01); *G09G 3/3614* (2013.01); *G09G 2310/08* (2013.01); *G09G 2320/0204* (2013.01); *G09G 2320/0247* (2013.01)

(58) Field of Classification Search
USPC .................................................... 345/87, 690
See application file for complete search history.

(56) References Cited

U.S. PATENT DOCUMENTS

| | | |
|---|---|---|
| 6,294,274 B1 | 9/2001 | Kawazoe et al. |
| 6,469,765 B1 | 10/2002 | Matsuyama et al. |
| 6,563,174 B2 | 5/2003 | Kawasaki et al. |
| 6,577,295 B2 | 6/2003 | Kikkawa |
| 6,727,522 B1 | 4/2004 | Kawasaki et al. |
| 6,781,645 B2 | 8/2004 | Kikkawa |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,977,169 B2 | 7/2011 | Hirao et al. |
| 7,982,835 B2 | 7/2011 | Naka et al. |
| 7,995,181 B2 | 8/2011 | Choi et al. |
| 8,289,489 B2 | 10/2012 | Im et al. |
| 8,395,716 B2 | 3/2013 | Ishitani et al. |
| 8,482,005 B2 | 7/2013 | Yamazaki et al. |
| 8,531,618 B2 | 9/2013 | Koyama et al. |
| 8,619,104 B2 | 12/2013 | Umezaki et al. |
| 8,687,157 B2 | 4/2014 | Uochi |
| 8,754,839 B2 | 6/2014 | Koyama |
| 8,823,893 B2 | 9/2014 | Yamazaki |
| 9,070,329 B2 | 6/2015 | Koyama |
| 9,086,605 B2 | 7/2015 | Sato et al. |
| 9,244,323 B2 | 1/2016 | Yamazaki |
| 9,298,035 B2 | 3/2016 | Yamazaki et al. |
| 9,348,189 B2 | 5/2016 | Ishitani et al. |
| 9,620,525 B2 | 4/2017 | Yamazaki |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0001809 A1 | 1/2006 | Lee et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0171319 A1* | 7/2007 | Fujita ............... G02F 1/134309 349/43 |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0279359 A1 | 12/2007 | Yoshida et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0237606 A1 | 9/2009 | Higano et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0182273 A1 | 7/2010 | Noguchi et al. |
| 2010/0302492 A1* | 12/2010 | Kubota ............. G02F 1/134363 349/139 |

(56) References Cited

U.S. PATENT DOCUMENTS

| | | | |
|---|---|---|---|
| 2011/0090416 | A1 | 4/2011 | Arasawa et al. |
| 2011/0134345 | A1 | 6/2011 | Yamazaki et al. |
| 2012/0075238 | A1 | 3/2012 | Minami et al. |
| 2012/0249496 | A1 | 10/2012 | Pai |
| 2014/0002516 | A1 | 1/2014 | Koyama et al. |
| 2014/0016056 | A1 | 1/2014 | Miyake et al. |
| 2014/0104507 | A1 | 4/2014 | Yamazaki et al. |
| 2014/0104508 | A1 | 4/2014 | Yamazaki et al. |
| 2014/0111561 | A1 | 4/2014 | Iyama et al. |
| 2014/0347588 | A1* | 11/2014 | Hatsumi ........... G02F 1/134363 349/43 |
| 2016/0210910 | A1 | 7/2016 | Yamazaki et al. |
| 2016/0259217 | A1 | 9/2016 | Ishitani et al. |
| 2017/0039977 | A1 | 2/2017 | Yamazaki |

FOREIGN PATENT DOCUMENTS

| | | |
|---|---|---|
| CN | 102648490 A | 8/2012 |
| CN | 102844806 A | 12/2012 |
| EP | 1 737 044 A1 | 12/2006 |
| EP | 2 226 847 A2 | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 11-174491 A | 7/1999 |
| JP | 2000-044236 A | 2/2000 |
| JP | 2000-150900 A | 5/2000 |
| JP | 2000-356786 A | 12/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-523850 | 10/2006 |
| JP | 2008-533693 | 8/2008 |
| JP | 2009-134228 A | 6/2009 |
| JP | 2009-229599 A | 10/2009 |
| JP | 2011-039478 A | 2/2011 |
| JP | 2011-186449 A | 9/2011 |
| JP | 2011-237760 A | 11/2011 |
| JP | 2012-113292 A | 6/2012 |
| JP | 2013-080185 A | 5/2013 |
| WO | WO 2004/019117 A2 | 3/2004 |
| WO | WO 2004/114391 A | 12/2004 |
| WO | WO 2007/094501 A1 | 8/2007 |
| WO | WO 2011/065230 A1 | 6/2011 |
| WO | WO 2011/074391 A1 | 6/2011 |
| WO | WO 2011/081010 A1 | 7/2011 |
| WO | WO 2011/099376 A1 | 8/2011 |
| WO | WO 2013/001979 A1 | 1/2013 |

OTHER PUBLICATIONS

Amano, S. et al., "Low Power LC Display Using In—Ga—Zn-Oxide TFTs Based on Variable Frame Frequency,"SID Digest '10: SID International Symposium Digest of Technical Papers, 2010, vol. 41, pp. 626-629.

Hatsumi, R. et al., "Driving Method of FFS-Mode OS-LCD for Reducing Eye Strain," SID Digest '13: SID International Symposium Digest of Technical Papers, May 21, 2013, pp. 338-341.

Asakuma, N. et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y. et al., "29,1: Polarizer-Free Reflective LCD Combined With Ultra Low-Power Driving Technology," SID Digest '09: SID International Symposium Digest of Technical Papers, May 31, 2009, pp. 395-398.

Chern, H.N. et al., "An Analytical Model for the Above-Threshold Characteristics of Polysilicon thin-Film Transistors,"IEEE Transactions On Electron Devices, Jul. 1, 1995, vol. 42, No. 7, pp. 1240-1246.

Cho, D-H. et al., "21.2:Al and Sn-Doped Zinc Indium Oxide Thin Film Transistors for AMOLED Back-Plane," SID Digest '09: SID International Symposium Digest of Technical Papers, May 31, 2009, pp. 280-283.

Clark, S.J. et al., "First Principles Methods Using CASTEP," Zeitschrift fur Kristallographie, 2005, vol. 220, pp. 567-570.

Coates, D. et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M.J. et al., "Electron Microscopy of a Cholesteric Liquid Crystal and Its Blue Phase," Physical Review. A, May 1, 1984, vol. 29, No. 5, pp. 2957-2959.

Dembo, H. et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E.M.C. et al., "Wide-Bandgap High-Mobility ZnO Thin-Film Transistors Produced at Room Temerapture," Applied Physics Letters , Sep. 27, 2004, vol. 85, No. 13, pp. 2541-2543.

Fung, T.C. et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H. et al., "P-9:Numerical Analysis on Temperature Dependence of Characteristics of Amorphous In—Ga—Zn-Oxide TFT," SID Digest '09: SID International Symposium Digest of Technical Papers, May 31, 2009, pp. 1110-1112.

Godo, H. et al., "Temperature Dependence of Characteristics and Electronic Structure for Amorphous In—Ga—Zn-Oxide TFT," AM-FPD '09 Digest of Technical Papers, Jul. 1, 2009, pp. 41-44.

Hayashi, R. et al., "42.1: Invited Paper: Improved Amorphous In—Ga—Zn—O TFTs," SID Digest '08: SID International Symposium Digest of Technical Papers, May 20, 2008, vol. 39, pp. 621-624.

Hirao, T. et al., "Novel Top-Gate Zinc Oxide Thin-Film Transistors (ZnO TFTs) for AMLCDS," Journal of the Society for Information Display, 2007, vol. 15, No. 1, pp. 17-22.

Hosono, H. et al., "Working Hypothesis to Explore Novel Wide Band Gap Electrically Conducting Amorphous Oxides and Examples," Journal of Non-Crystalline Solids, 1996, vol. 198-200, pp. 165-169.

Hosono, H., "68.3: Invited Paper:Transparent Amorphous Oxide Semiconductors for High Performance TFT," SID Digest '07: SID International Symposium Digest of Technical Papers, 2007, vol. 38, pp. 1830-1833.

Hsieh, H-H. et al., "P-29:Modeling of Amorphous Oxide Semiconductor Thin Film Transistors and Subgap Density of States," SID Digest '08: SID International Symposium Digest of Technical Papers, May 20, 2008, vol. 39, pp. 1277-1280.

Ikeda, T. et al., "Full-Functional System Liquid Crystal Display Using CG-Silicon Technology," SID Digest '04: SID International Symposium Digest of Technical Papers, 2004, vol. 35, pp. 860-863.

Janotti, A. et al., "Native Point Defects in ZnO," Physical Review. B, Oct. 4, 2007, vol. 76, No. 16, pp. 165202-1-165202-22.

Janotti, A. et al., "Oxygen Vacancies in ZnO," Applied Physics Letters, 2005, vol. 87, pp. 122102-1-122102-3.

Jeong, J.K. et al., "3.1: Distinguished Paper: 12.1-Inch WXGA AMOLED Display Driven by Indium-Gallium-Zinc Oxide TFTs Array," SID Digest '08: SID International Symposium Digest of Technical Papers, May 20, 2008, vol. 39, No. 1, pp. 1-4.

Jin, D-U. et al., "65.2: Distinguished Paper:World-Largest (6.5") Flexible Full Color Top Emission AMOLED Display on Plastic Film and Its Bending Properties," SID Digest '09: SID International Symposium Digest of Technical Papers, May 31, 2009, pp. 983-985.

(56) References Cited

OTHER PUBLICATIONS

Kanno, H. et al., "White Stacked Electrophosphorecent Organic Light-Emitting Devices Employing MoO3 as a Charge-Generation Layer," Advanced Materials, 2006, vol. 18, No. 3, pp. 339-342.

Kikuchi, H. et al., "39.1: Invited Paper:Optically Isotropic Nano-Structured Liquid Crystal Composites for Display Applications," SID Digest '09: SID International Symposium Digest of Technical Papers, May 31, 2009. pp. 578-581.

Kikuchi, H. et al., "62.2: Invited Paper:Fast Electro-Optical Switching in Polymer-Stabilized Liquid Crystalline Blue Phases For Display Application," SID Digest '07: SID International Symposium Digest of Technical Papers, 2007, vol. 38, pp. 1737-1740.

Kikuchi, H. et al., "Polymer-Stabilized Liquid Crystal Blue Phases," Nature Materials, Sep. 2, 2002, vol. 1, pp. 64-68.

Kim, S. et al., "High-Performance Oxide Thin Film Transistors Passivated by Various Gas Plasmas," 214th ECS Meeting, 2008, No. 2317, ECS.

Kimizuka, N. et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H-S. et al., "Observation of Blue Phases in Chiral Networks," Liquid Crystals, 1993, vol. 14, No. 3, pp. 911-916.

Kurokawa, Y. et al., "UHF RFCPUS on Flexible and Glass Substrates for Secure RFID Systems," Journal of Solid-State Circuits , 2008, vol. 43, No. 1, pp. 292-299.

Lany, S. et al., "Dopability, Intrinsic Conductivity, and Nonstoichiometry of Transparent Conducting Oxides," Physical Review Letters, Jan. 26, 2007, vol. 98, pp. 045501-1-045501-4.

Lee, H.N. et al., "Current Status of, Challenges to, and Perspective View of AM-OLED," IDW '06: Proceedings of the 13th International Display Workshops, Dec. 7, 2006, pp. 663-666.

Lee, J-H. et al., "World's Largest (15-Inch) XGA AMLCD Panel Using IGZO Oxide TFT," SID Digest '08: SID International Symposium Digest of Technical Papers, May 20, 2008, vol. 39, pp. 625-628.

Lee, M-H. et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C. et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S. et al., "Transparent Thin Film Transistors Using ZnO as an Active Channel Layer and Their Electrical Properties," Journal of Applied Physics, Feb. 1, 2003, vol. 93, No. 3, pp. 1624-1630.

Meiboom, S. et al., "Theory of the Blue Phase of Cholesteric Liquid Crystals," Physical Review Letters, May 4, 1981, vol. 46, No. 18, pp. 1216-1219.

Miyasaka, M., "Suftla Flexible Microelectronics on Their Way to Business," SID Digest '07 : SID International Symposium Digest of Technical Papers, 2007, vol. 38, pp. 1673-1676.

Mo, Y-G. et al., "Amorphous Oxide TFT Backplanes for Large Size AMOLED Displays," IDW '08: Proceedings of The 6th International Display Workshops, Dec. 3, 2008, pp. 581-584.

Nakamura, M. et al., "The Phase Relations in the In2O3—Ga2ZnO4—ZnO system at 1350° C.," Journal of Solid State Chemistry, Aug. 1, 1991, vol. 93, No. 2, pp. 298-315.

Nakamura, M., "Synthesis of Homologous Compound with New Long-Period Structure," NIRIM Newsletter, Mar. 1, 1995, vol. 150, pp. 1-4.

Nomura, K. et al., "Amorphous Oxide Semiconductors for High-Performance Flexible Thin-Film Transistors," Japanese Journal of Applied Physics, 2006, vol. 45, No. 5B, pp. 4303-4308.

Nomura, K. et al., "Carrier Transport In Transparent Oxide Semiconductor With Intrinsic Structural Randomness Probed Using Single-Crystalline InGaO3(ZnO)5 films," Applied Physics Letters, Sep. 13, 2004, vol. 85, No. 11, pp. 1993-1995.

Nomura, K. et al., "Room-Temperature Fabrication of Transparent Flexible Thin-Film Transistors Using Amorphous Oxide Semiconductors," Nature, Nov. 25, 2004, vol. 432, pp. 488-482.

Nomura, K. et al., "Thin-Film Transistor Fabricated in Single-Crystalline Transparent Oxide Semiconductor," Science, May 23, 2003, vol. 300, No. 5623, pp. 1269-1272.

Nowatari, H. et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F. et al., "Defect Energetics in ZnO: A Hybrid Hartree-Fock Density Functional Study," Physical Review. B, 2008, vol. 77, pp. 245202-1-245202-6.

Oh, M.S. et al., "Improving the Gate Stability of ZnO Thin-Film Transistors With Aluminum Oxide Dielectric Layers," Journal of the Electrochemical Society, 2008, vol. 155, No. 12, pp. H1009-H1014.

Ohara, H. et al., "21.3:4.0 In. QVGA AMOLED Display Using In—Ga—Zn-Oxide TFTs With a Novel Passivation Layer," SID Digest '09: SID International Symposium Digest of Technical Papers, May 31, 2009, pp. 284-287.

Ohara, H. et al., "Amorphous In—Ga—Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M. et al., "Amorphous Transparent Conductive Oxide InGaO3(ZnO)m (m<4):a Zn4s Conductor," Philosophical Magazine, 2001, vol. 81, No. 5, pp. 501-515.

Orita, M. et al., "Mechanism of Electrical Conductivity of Transparent InGaZnO4," Physical Review. B, Jan. 15, 2000, vol. 61, No. 3, pp. 1811-1816.

Osada, T. et al., "15.2: Development of Driver-Integrated Panel using Amorphous In—Ga—Zn-Oxide TFT," SID Digest '09: SID International Symposium Digest of Technical Papers, May 31, 2009, pp. 184-187.

Osada, T. et al., "Development of Driver-Integrated Panel Using Amorphous In—Ga—Zn-Oxide TFT," AM-FPD '09 Digest of Technical Papers, Jul. 1, 2009, pp. 33-36.

Park, J-S. et al., "Amorphous Indium-Gallium-Zinc Oxide TFTs and Their Application for Large Size AMOLED," AM-FPD '08 Digest of Technical Papers, Jul. 2, 2008, pp. 275-278.

Park, J.S. et al., "Dry etching of ZnO Films and Plasma-Induced Damage to Optical Properties," Journal of Vacuum Science & Technology B, Mar. 1, 2003, vol. 21, No. 2, pp. 800-803.

Park, J-S. et al., "Electronic Transport Properties of Amorphous Indium-Gallium-Zinc Oxide Semiconductor Upon Exposure to Water," Applied Physics Letters, 2008, vol. 92, pp. 072104-1-072104-3.

Park, J.C. et al., "High Performance Amorphous Oxide Thin Film Transistors With Self-Aligned Top-Gate Structure," IEDM 09: Technical Digest of International Electron Devices Meeting, Dec. 7, 2009, pp. 191-194.

Park, J-S. et al., "Improvements in the Device Characteristics of Amorphous Indium Gallium Zinc Oxide Thin-Film Transistors by Ar Plasma Treatment," Applied Physics Letters, Jun. 26, 2007, vol. 90, No. 26, pp. 262106-1-262106-3.

Park, S. et al., "Challenge to Future Displays: Transparent AM-OLED Driven by PEALD Grown ZnO TFT," IMID '07 Digest, 2007, pp. 1249-1252.

Park, Sang-Hee et al., "42.3: Transparent ZnO Thin Film Transistor for the Application of High Aperture Ratio Bottom Emission AM-OLED Display," SID Digest '08: SID International Symposium Digest of Technical Papers, May 20, 2008, vol. 39, pp. 629-632.

Prins, M.W.J. et al., "A Ferroelectric Transparent Thin-Film Transistor," Applied Physics Letters, Jun. 17, 1996, vol. 68, No. 25, pp. 3650-3652.

(56) References Cited

OTHER PUBLICATIONS

Sakata, J. et al., "Development of 4.0-IN. AMOLED Display With Driver Circuit Using Amorphous In—Ga—Zn-Oxide TFTs," IDW '09: Proceedings of the 16th International Display Workshops, 2009, pp. 689-692.
Son, K-S. et al., "42.4L: Late-News Paper: 4 Inch QVGA AMOLED Driven by the Threshold Voltage Controlled Amorphous GIZO (Ga2O3—In2O3—ZnO) TFT," SID Digest '08: SID International Symposium Digest of Technical Papers, May 20, 2008, vol. 39, pp. 633-636.
Takahashi, M. et al., "Theoretical Analysis of IGZO Transparent Amorphous Oxide Semiconductor," IDW '08: Proceedings of the 15th International Display Workshops, Dec. 3, 2008, pp. 1637-1640.
Tsuda, K. et al., "Ultra Low Power Consumption Technologies for Mobile TFT-LCDs," IDW '02: Proceedings of the 9th International Display Workshops, Dec. 4, 2002, pp. 295-298.
Ueno, K. et al., "Field-Effect Transistor on SrTiO3 With Sputtered Al2O3 Gate Insulator," Applied Physics Letters, Sep. 1, 2003, vol. 83, No. 9, pp. 1755-1757.
Van de Walle, C.G., "Hydrogen as a Cause of Doping in Zinc Oxide," Physical Review Letters, Jul. 31, 2000, vol. 85, No. 5, pp. 1012-1015.
Chinese Office Action re Appliction No. CN 201410356169.0, dated Jun. 25, 2018.

\* cited by examiner

<Normal>

<IDS>

<Normal>

<IDS> still image IM1    still image IM2

<Example 1>

<Comparative Example 1>

<Example 1>

<Comparative Example 1>

LIQUID CRYSTAL DISPLAY DEVICE AND ELECTRONIC DEVICE

This application is a continuation of copending U.S. application Ser. No. 14/337,731, filed on Jul. 22, 2014 which is incorporated herein by reference.

BACKGROUND OF THE INVENTION

1. Field of the Invention

The present invention relates to a liquid crystal display device and a method for driving the liquid crystal display device. Further, the present invention relates to an electronic device provided with the liquid crystal display device in a display portion.

Note that in this specification, a semiconductor device means a circuit having a semiconductor element (e.g., a transistor or a diode) and a device having the circuit. The semiconductor device also means any device that can function by utilizing semiconductor characteristics. For example, an integrated circuit, a chip including an integrated circuit, a display device, a light-emitting device, a lighting device, and an electronic device are all semiconductor devices.

2. Description of the Related Art

As information society is developed, we gain information more often by information terminals, such as smartphones and personal computers, than by paper media. Thus, we keep watching screens from a short distance for a long period, and we overwork our eyes on a daily basis. There are multiple causes of eye strain, and one of them is a screen flicker.

In a display device, images are switched some dozen times per second. The number of image switching operations per second is called refresh rate. The refresh rate is also referred to as driving frequency. Such high-speed screen switching that cannot be recognized by human eyes is considered as a cause of eye strain. A typical example of a display means of an information terminal includes a liquid crystal display device (LCD). Thus, Non-Patent Documents 1 and 2 have proposed that the refresh rate of an LCD is lowered to reduce the number of image rewriting operations.

Driving methods (modes) of an active-matrix LCD are classified by a way of control of alignment of liquid crystal molecules. For example, a twisted nematic (TN) mode, a vertical alignment (VA) mode, an in-plane switching (IPS) mode, a fringe field switching (FES) mode, and the like are known. Pixel structures of LCDs are different among the driving methods.

In pixels of a TN or VA LCD, a pixel electrode is formed on one of a pair of substrates and a common electrode (also referred to as a counter electrode) is formed on the other substrate. An electric field that is perpendicular to the two substrate surfaces is formed between the pixel electrode and the common electrode to control alignment of liquid crystal molecules, so that the transmittance of the pixels is controlled.

In contrast, in an IPS or FFS LCD, a common electrode is formed on the same surface where the pixel electrode is formed. In an IPS LCD, the common electrode and the pixel electrode have a comb-shape pattern and are formed on the same insulating film. An FFS mode is an improved display mode of the IPS mode, and in the FFS LCD, a pixel electrode and a common electrode are formed to face each other with an insulating film therebetween. For example, the pixel electrode in an FFS LCD has a structure in which a plurality of slits are provided, and alignment of liquid crystal molecules is controlled by an electric field (fringe field) formed between a fringe of a pixel electrode and a common electrode; thus, an FFS LCD has a wider viewing angle and higher transmittance than an IPS LCD.

Various improvements have been made on an FFS LCD, and for example, Patent Document 1 discloses that a second common electrode is formed on a substrate on which a pixel electrode is not formed, and the LCD can have a high-speed response and a wide viewing angle by a potential applied to the second common electrode.

REFERENCE

Patent Document

[Patent Document 1] PCT International Publication No. 2004/019117

Non-Patent Document

[Non-Patent Document 1] S. Amano et al., "Low Power LC Display Using In—Ga—Zn-Oxide TFTs Based On Variable Frame Frequency", *SID International Symposium Digest of Technical Papers*, 2010, pp 626-629

[Non-Patent Document 2] R. Hatsumi et al., "Driving Method of FFS-Mode OS-LCD for Reducing Eye Strain", *SID International Symposium Digest of Technical Papers*, 2013, pp 338-341

SUMMARY OF THE INVENTION

In view of the foregoing background, it is an object of one embodiment of the present invention to provide a new FFS liquid crystal display device and a driving method or the like thereof.

Another object of one embodiment of the present invention is to provide a liquid crystal display device capable of eye-friendly display and a driving method or the like thereof.

Note that the description of a plurality of objects does not mutually preclude the existence. Note that one embodiment of the present invention does not necessarily achieve all the objects listed above. Objects other than those listed above are apparent from the description of the specification, drawings, and claims, and also such objects could be an object of one embodiment of the present invention.

One embodiment of the present invention is a liquid crystal display device including first and second substrates facing each other; a liquid crystal layer between the first and second substrates; a pixel electrode and a first common electrode over the first substrate; and a second common electrode on the second substrate. The pixel electrode faces the first common electrode with an insulating layer therebetween. The second common electrode faces the first common electrode with the liquid crystal layer therebetween. A data signal corresponding to image data is supplied to the pixel electrode. The same potential is supplied to the first and second common electrodes.

Another embodiment of the present invention is a liquid crystal display device including first and second substrates facing each other; a liquid crystal layer between the first and second substrates; a pixel; a gate line and a source line connected to the pixel; a gate driver that generates a gate signal and outputs the gate signal to the gate line; a source driver that generates a data signal and outputs the data signal to the source line; and a controller that controls the gate driver and the source driver. The pixel includes a transistor, a pixel electrode, and a first common electrode formed over the first substrate and a second common electrode on the second substrate. A gate of the transistor is connected to the gate line, and the transistor serves as a switch that controls the connection between the pixel electrode and the source line. The pixel electrode faces the first common electrode with the insulating layer therebetween. The second common electrode faces the first common electrode with the liquid crystal layer therebetween and is supplied with a potential that is the same as that supplied to the first common electrode. The controller has a control function of making the gate driver and the source driver retain a data signal that are input to the pixel for a longer period than one frame period.

In any of the above embodiments, as the transistor in the pixel that serves as a switch for controlling the connection between the pixel electrode and the source line, a transistor whose channel is formed in an oxide semiconductor layer is preferably used.

With one embodiment of the present invention, a flicker that occurs in data rewriting can be reduced; thus, a liquid crystal display device capable of eye-friendly display and the driving method or the like thereof can be provided.

DETAILED DESCRIPTION OF THE INVENTION

Figure 1A:
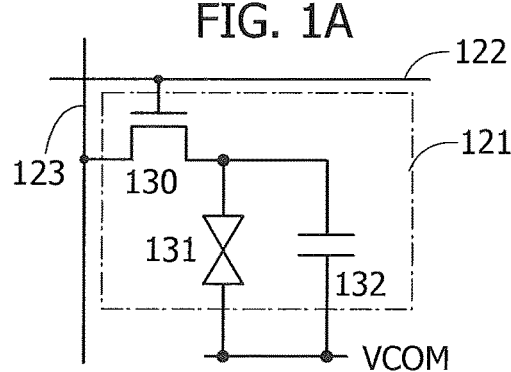
FIG. 1A is a circuit diagram illustrating a structural example of a pixel of an FFS LCD.

Hereinafter, embodiments of the present invention will be described in detail with reference to the accompanying drawings. Note that the present invention is not limited to the following description, and it is easily understood by those skilled in the art that modes and details of the invention can be modified in various ways. Therefore, the present invention is not construed as being limited to the description of the following embodiments.

In the drawings used for the description of embodiments of the present invention, the same portions or portions having similar functions are denoted by the same reference numerals, and description thereof is not repeated.

Embodiment 1

In this embodiment, an LCD will be described as an example of a semiconductor device with reference to FIGS. 1A to 1C, FIGS. 2A and 2B, FIGS. 3A and 3B, and FIGS. 4A and 4B. Furthermore, in this embodiment, an FFS LCD will be described.

<<Structural Example of LCD>>

Figure 2A:
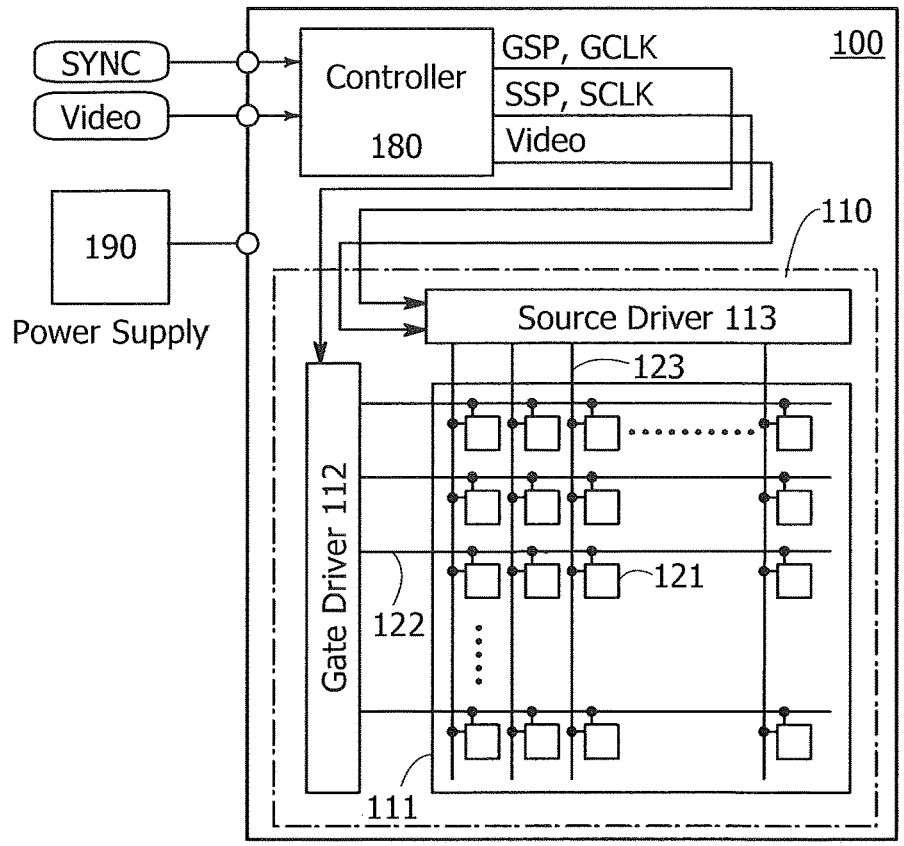
FIG. 2A is a block diagram illustrating a structural example of an FFS LCD.

FIG. 2A is a block diagram illustrating a structural example of an LCD 100. As illustrated in FIG. 2A, the LCD 100 includes a pixel portion 111, a gate driver 112, a source driver 113, and a controller 180. In the LCD 100, a circuit block surrounded by a dashed-dotted line in FIG. 2A forms a module serving as a liquid crystal (LC) panel 110. The LC panel 110 includes the pixel portion 111, the gate driver 112, and the source driver 113.

An image signal (Video), a synchronization signal (SYNC) for controlling rewriting of data in the LC panel 110, and a control signal such as a reference clock signal (CLK) are input to the LCD 100. Examples of the synchronization signal include a horizontal synchronization signal and a vertical synchronization signal. A power source 190 supplies voltage needed for operation to the LCD 100.

The pixel portion 111 includes a plurality of pixels 121, a plurality of gate lines 122, and a plurality of source lines 123. The plurality of pixels 121 are arranged in a two-dimensional array, and the gate lines 122 and the source lines 123 are provided in accordance with the arrangement of the pixels 121. The pixels 121 in the same row are connected to the gate driver 112 through a common gate line 122, and the pixels 121 in the same column are connected to the source driver 113 through a common source line 123.

The controller 180 controls the whole LC panel 110 and generates signals for controlling circuits in the LCD 100. The controller 180 includes a control signal generation circuit in which signals for controlling the drivers (112 and 113) are generated from the synchronization signal (SYNC). The synchronization signal (SYNC) is a vertical synchronization signal, a horizontal synchronization signal, a reference clock signal, or the like.

In the controller 180, a start pulse signal (GSP), a clock signal (GCLK), and the like are generated as signals for controlling the gate driver 112, and a start pulse signal (SSP), a clock signal (SCLK), and the like are generated as signals for controlling the source driver 113. Note that such signals may each be a group of signals instead of a single signal.

In the following description, a start pulse signal (GSP) is simply referred to as GSP or a signal GSP in some cases. The same can apply to other signals, voltages, potentials, circuits, and wirings.

The controller 180 also includes a power control unit and controls the supply of a power source voltage to the drivers (112 and 113) and the suspension thereof.

When GSP is input to the gate driver 112, a gate signal is generated in accordance with GCLK and output to each gate line 122 sequentially. The gate signal selects the pixel 121 to which a data signal is to be written.

The source driver 113 processes an image signal (Video) to generate a data signal and outputs the data signal to the source line 123. When SSP is input to the source driver 113, a data signal is generated in accordance with SCLK and output to each source line 123 sequentially.

The pixel 121 includes a switching element whose on/off state is controlled by a gate signal. When the switching element is turned on, a data signal is written from the source driver 113 to the pixel 121. When the switching element is turned off, written data is retained in the pixel 121.

<<Structural Example of LC Panel>>

The LC panel 110 includes a substrate 21 and a substrate 22 facing each other. The substrate 21 and the substrate 22 are fixed by a sealing member 23 with a space therebetween. A liquid crystal layer 20 is provided between the substrate 21 and the substrate 22 (see FIG. 1B).

The substrate 21 is a support substrate of a backplane of the LC panel 110. The circuits (111 to 113) and a terminal portion 24 are formed over the substrate 21. The substrate 21 over which the circuits (111 to 113) are formed is referred to as an element substrate, a thin film transistor (TFT) substrate, or the like.

Figure 2B:
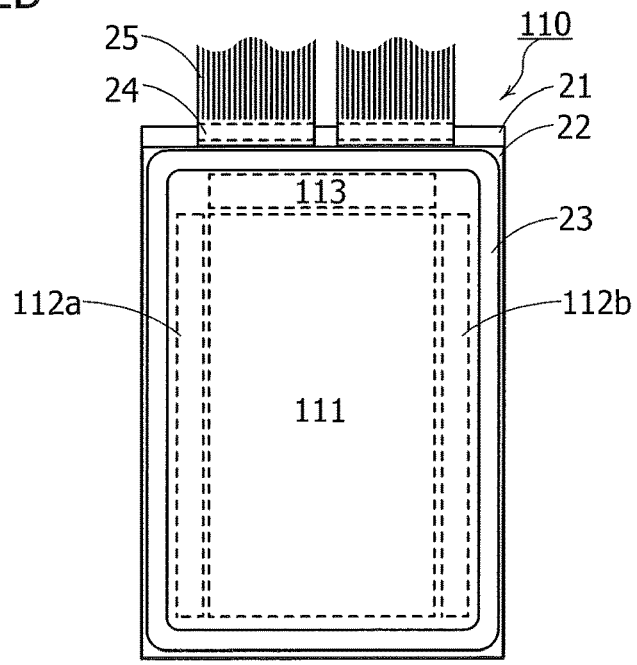
FIG. 2B is a plan view illustrating a structural example of a liquid crystal (LC) panel.

FIG. 2B illustrates a structural example in which the gate driver 112 is divided into two circuits (gate drivers 112*a* and 112*b*) and the two circuits are arranged on both sides of the pixel portion 111. Needless to say, the gate driver 112 can be formed of one circuit and can be arranged on one side of the pixel portion 111.

A plurality of terminals are formed in the terminal portion 24. An electrode and a wiring formed over the substrate 21 and an electrode and a wiring formed on the substrate 22 are connected to the terminals of the terminal portion 24 by a lead wiring or the like. The terminal portion 24 is connected to a flexible printed circuit (FPC) 25 with a conductive material such as an anisotropic conductive film. Voltage and signals are input to each of the circuits (111 to 113) over the substrate 21 through the FPC 25.

An IC chip including the controller 180 may be mounted on the substrate 21. Alternatively, part or the whole of the drivers (112 and 113) may be formed as an IC chip, and the IC chip may be mounted on the substrate 21. Examples of the mounting methods include a chip on glass (COG) method, a chip on film (COF) method, a wire bonding method, and a tape automated bonding (TAB) method.

As described later, a pixel electrode and a common electrode for driving liquid crystal molecules are formed over the substrate 21. The substrate 22 is a supporting substrate that is a component referred to as a counter substrate, a color filter substrate, or the like. The substrate 22 is also provided with a common electrode.

<<Structural Example of Pixel>>

Figure 1B:
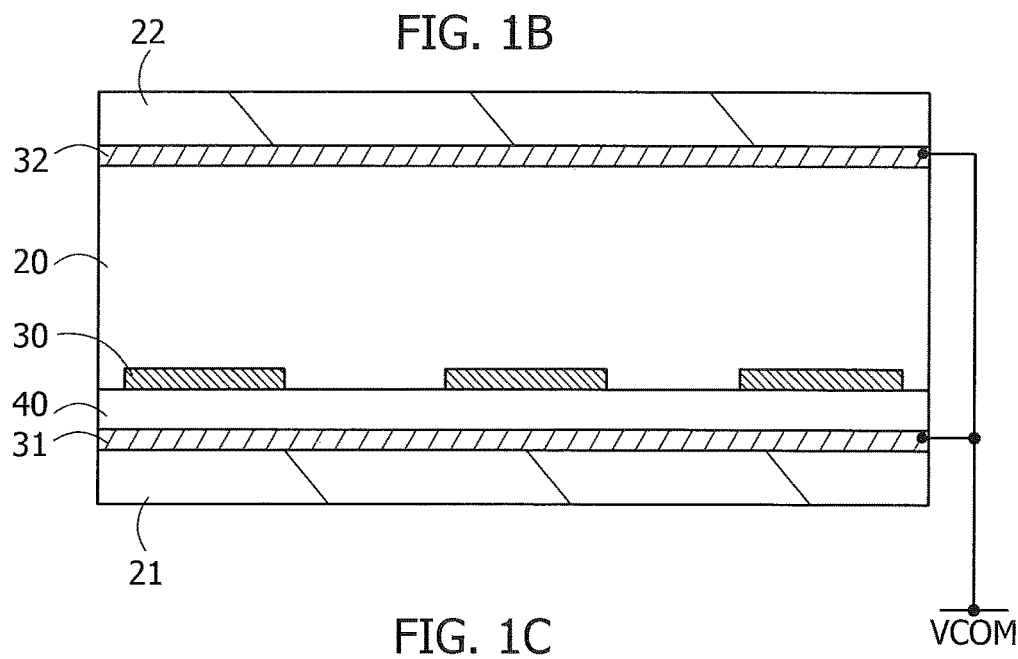
FIG. 1B is a schematic cross-sectional view illustrating a structure of electrodes.
Figure 1C:
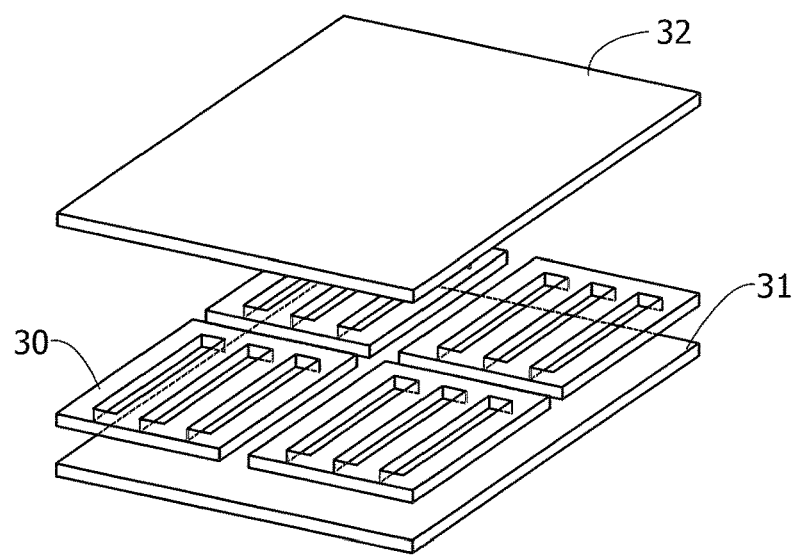
FIG. 1C is a perspective view of FIG. 1B.

FIG. 1A is a circuit diagram illustrating an example of a circuit configuration of the pixel 121. FIGS. 1B and 1C are schematic diagrams for illustrating a structure of electrodes of the pixel 121. FIG. 1B is a cross-sectional view of main components of the pixel 121. FIG. 1C is a perspective view of FIG. 1B.

<Circuit Configuration>

As illustrated in FIG. 1A, the pixel 121 includes a transistor 130, a liquid crystal element 131, and a capacitor 132.

A gate of the transistor 130 is connected to the gate line 122, and the transistor 130 is a switching element for controlling the connection between the liquid crystal element 131 and the source line 123. The on/off state of the transistor 130 is controlled by a gate signal output from the gate driver 112.

The liquid crystal element 131 includes two electrodes 30 and 31 and the liquid crystal layer 20 (FIG. 1B). Here, of the two electrodes of the liquid crystal element 131, the electrode 30 connected to the source line 123 with the transistor 130 therebetween is called pixel electrode, and the other electrode (31) is called common electrode. A common voltage VCOM is applied to the common electrode 31.

The capacitor 132 is connected in parallel to the liquid crystal element 131 and serves as an auxiliary capacitor of the liquid crystal element 131. The capacitor 132 has an MIM structure in which an insulating layer 40 serves as a dielectric and a pixel electrode 30 and the common electrode 31 serve as a pair of electrodes (terminals) (FIG. 1B).

<Pixel Electrode and Common Electrode>

As illustrated in FIG. 1B, the pixel electrode 30 and the common electrode 31 are formed over the substrate 21. The pixel electrode 30 faces the common electrode 31 with the insulating layer 40 therebetween.

As illustrated in FIG. 1C, the pixels 121 each have one pixel electrode 30, and the pixel electrodes 30 are electrically isolated from one another. In contrast, the common electrode 31 is provided as one electrode of the pixel portion 111 to apply the same voltage (VCOM) to all of the pixels 121 in the pixel portion 111. Note that in the actual common electrode 31, openings for connecting the pixel electrodes 30 to the transistors 130 are provided.

In an example in FIG. 1C, a planar shape of the pixel electrode 30 is a tetragon having a plurality of strip-like openings; however, needless to say, one embodiment of the present invention is not limited to such a shape. The pixel electrode 30 may have any shape as long as a fringe field is formed by application of voltage to the pixel electrode 30 and the common electrode 31. For example, the pixel electrode 30 may include a portion in which a plurality of stripe-like objects are regularly arranged and a connecting portion for connecting the objects.

A common electrode 32 is provided on the substrate 22 to face the common electrode 31 with the liquid crystal layer 20 therebetween. Like the common electrode 31, the common electrode 32 is provided as one electrode (one conductive film) for all of the pixels 121. At the time of display, the common electrode 32 has the same potential as that of the common electrode 31, and a common voltage VCOM is applied thereto.

To give the same potential to the common electrodes 31 and 32, the common electrodes 31 and 32 may be connected to each other in the LC panel 110 and may be connected to the same terminal of the terminal portion 24 by a common lead wiring, so that VCOM may be applied to the terminal. Alternatively, the common electrode 31 may be connected to a terminal by a lead wiring and the common electrode 32 may be connected to another terminal by another lead wiring so that VCOM may be applied to each terminal.

Supply of VCOM to the LC panel 110 can be performed in such a manner that VCOM is generated with the power source 190 and then is supplied to the LC panel 110. In the case where VCOM is 0 V (ground potential), the common electrodes 31 and 32 are connected to terminals for a ground potential (GND). In such a case, supply of a power source voltage from the power source 190 is unnecessary.

<<Image Display Method of LCD>>

Giving the same potentials to the two common electrodes formed on the respective opposite substrates at the time of displaying images makes it possible to provide an FFS LCD in which a flicker at the time of rewriting images is reduced.

In an LCD, an image is displayed by inversion driving in which the polarity of a signal (data signal) that is written to a pixel is inverted every time data is rewritten. Because of the properties of a liquid crystal material, voltage-transmittance (V-T) characteristics of a pixel vary depending on the polarity of the data signal. Thus, change in transmittance of the pixel due to polarity inversion of the data signal is probably a cause of eye strain due to an LCD.

In view of the above, in this embodiment, loads on users' eyes are reduced by reducing the number of data rewriting operations (the number of polarity inversion operations of data). Thus, the LCD 100 has at least two driving methods (display modes). One is a driving method for general moving images in which data is rewritten every frame. This method is called "normal driving". The other is a driving method in which data rewriting is stopped after data write processing is executed. This method is called "idling stop (IDS) driving". In the IDS driving, data is rewritten less frequently than that in the normal driving.

A mode in which the LCD 100 displays images by the normal driving is called normal mode (state), and a mode in which the LCD 100 displays images by the IDS driving is called IDS mode (state).

Moving images are displayed by the normal driving. Still images are displayed by the normal driving or the IDS driving. When a signal that determines a display mode is input to the controller 180 in the LCD 100, the controller 180 controls the drivers (112 and 113) so that display is performed in the display mode.

In the case of displaying a still image, it is not necessary to rewrite data every frame because image data is not changed every frame. When the LCD 100 is driven in the IDS mode in displaying still images, power consumption can be reduced with a reduced screen flicker. The normal driving and the IDS driving will be described below with reference to FIGS. 3A and 3B and FIGS. 4A and 4B.

Figure 3A:
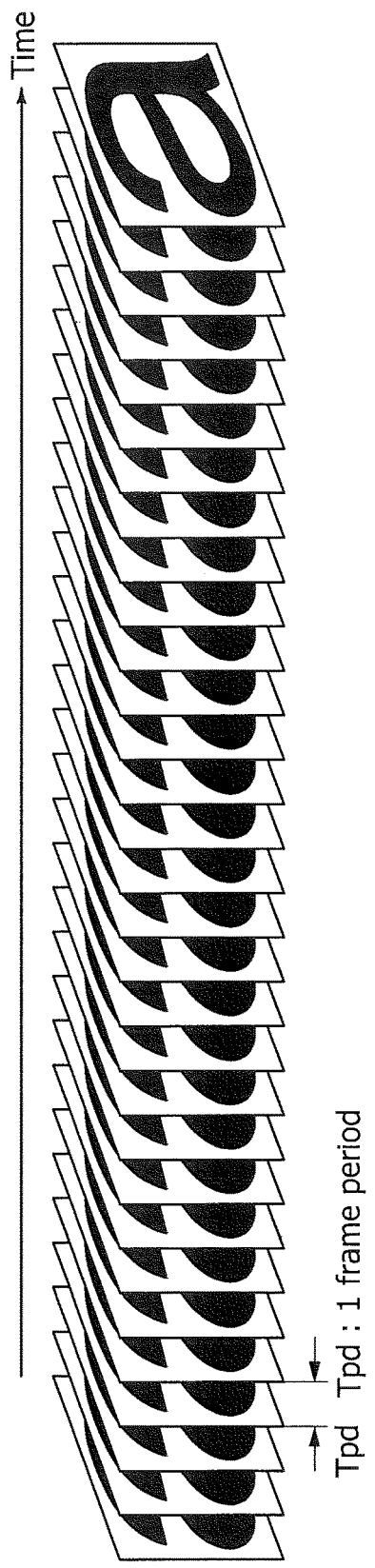
FIGS. 3A and 3B are schematic diagrams illustrating examples of a normal driving method and an IDS driving method, respectively, of an LCD.
Figure 3B:
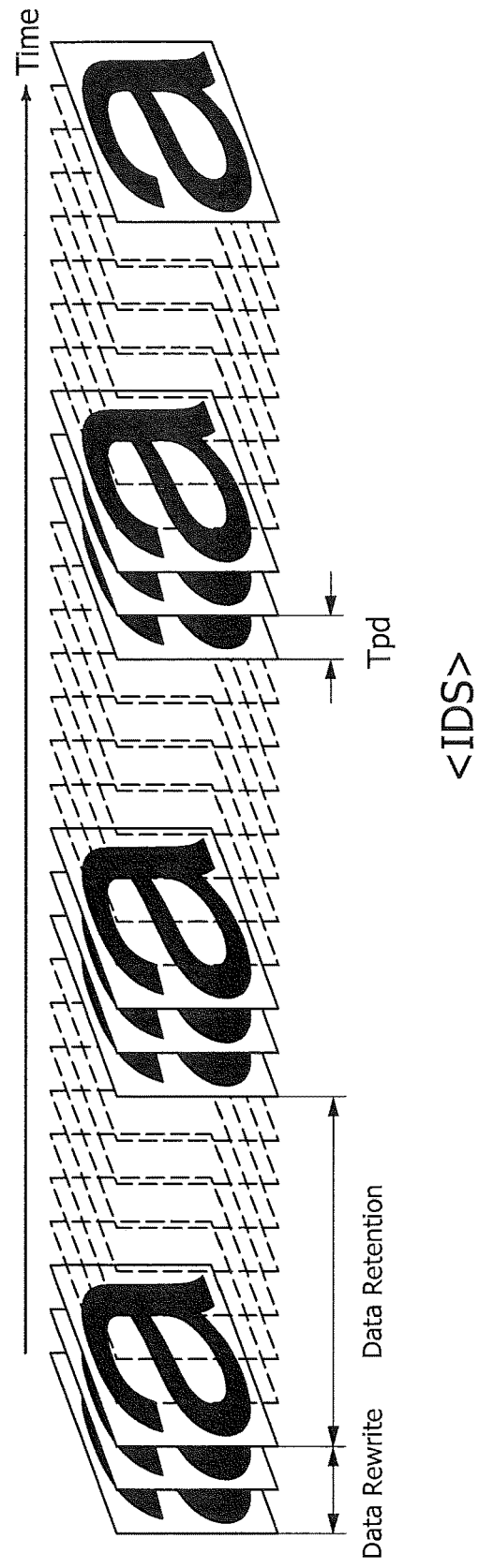
Figure 4A:
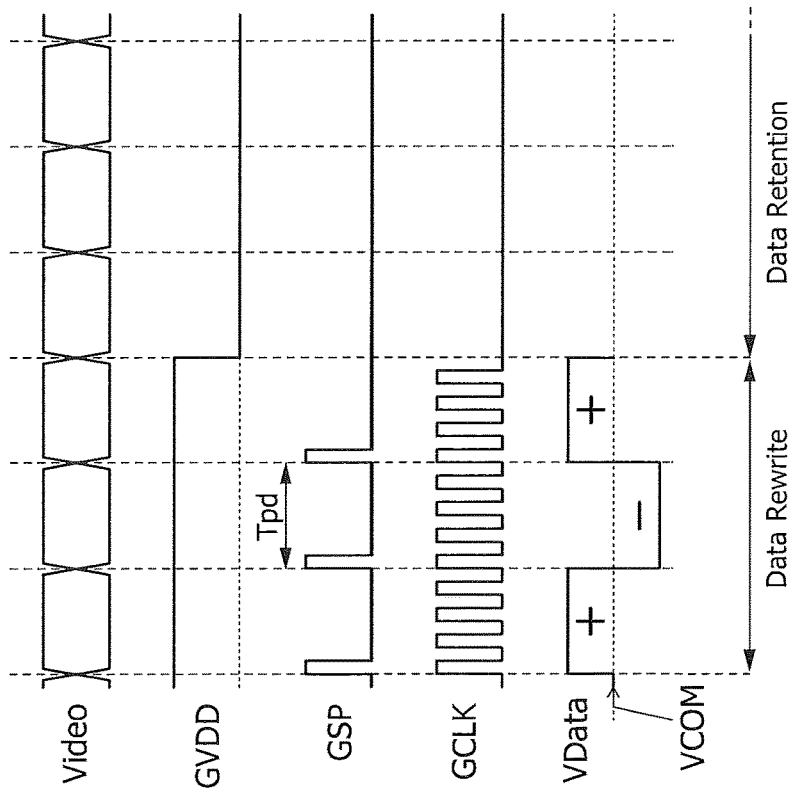
FIGS. 4A and 4B are timing charts illustrating examples of a normal driving method and an IDS driving method, respectively, of an LCD.
Figure 4B:
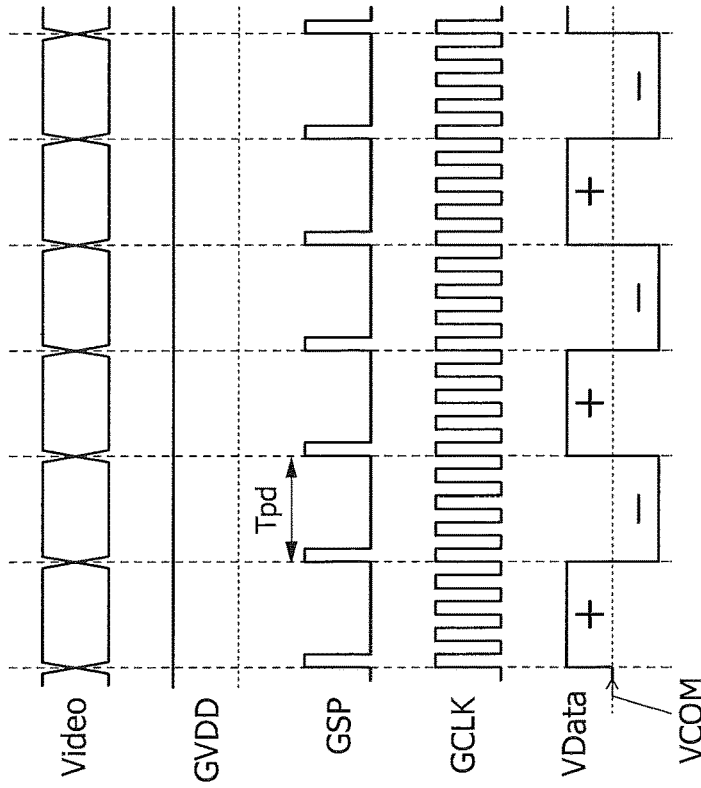

FIG. 3A shows a display method of still images by the normal driving, and FIG. 3B shows a display method of still images by the IDS driving. FIGS. 4A and 4B are timing charts showing examples of the normal driving and the IDS driving, respectively. In FIGS. 4A and 4B, Video is an image signal input to the LC panel 110, GVDD is a high power source voltage of the gate driver 112, and VData is a data signal output from the source driver 113 to the source line 123.

<Normal Driving>

The normal driving is a driving method in which inversion driving is performed every frame period (Tpd) to rewrite data of pixels periodically. When GSP is input, the gate driver 112 generates a gate signal in accordance with GCLK and outputs the gate signal to the gate line 122. When SSP is input, the source driver 113 generates VData in accordance with SCLK and outputs VData to the source line 123.

As shown in FIG. 4A, the polarity of VData input to each pixel 121 is inverted every frame period. Typical examples of the inversion driving include dot inversion driving, gate line inversion driving, and source line inversion driving.

Here, the polarity of VData is determined on the basis of VCOM. The polarity of VData is positive when the voltage thereof is higher than that of VCOM, and is negative when the voltage thereof is lower than that of VCOM.

<IDS Driving>

In the IDS driving, data is periodically rewritten at a lower refresh rate than that in the normal driving. Accordingly, the data retention period becomes longer than one frame period. FIG. 3B shows an example in which an image is rewritten every ten frames. In this case, the refresh rate of the IDS driving is one tenth of that of the normal driving. For example, when the refresh rate of the normal driving is 60 Hz, the refresh rate of the IDS driving shown in FIG. 3B is 6 Hz.

As shown in FIG. 3B and FIG. 4B, data rewriting processing by the IDS driving includes two kinds of processing: data rewriting (also referred to as writing processing) and data retention.

First, data rewriting is performed once or more times at the same refresh rate (period Tpd) as that of the normal driving, whereby data is written to the pixel 121. After the data writing, generation of gate signals in the gate driver 112 is stopped to suspend data rewriting. As a result, the transistors 130 are turned off in all the pixels 121 so that data is retained.

The number of data rewriting operations may be one or more. Even in the case of the IDS driving, data may be rewritten at the same refresh rate as that of the normal driving. The number of data rewriting operations can be set in consideration of the refresh rate and the like of the normal and IDS driving. FIG. 3B and FIG. 4B each show an example of performing data rewriting three times.

The number of data rewriting operations is adjusted so that the polarity of the last VData written to the pixel 121 is opposite to that of VData that is retained in the pixel in the preceding data retention period of the IDS mode. This inhibits degradation of the liquid crystal element 131 due to the IDS driving. For example, in the case where the number of data rewriting operations is an odd number, Vdata having a polarity opposite to that of VData that is retained in the pixel 121 in the preceding data retention period of the IDS mode is written to the pixel 121 in the first rewriting.

As can be seen from FIGS. 3A and 3B and FIGS. 4A and 4B, in the IDS mode, a still image can be displayed while data is rewritten less frequently than in the normal mode. Accordingly, display of still images in the IDS mode results in a reduced screen flicker and less eye strain.

As shown in FIG. 4B, in the IDS mode, the supply of control signals (GSP and GCLK) from the controller 180 to the gate driver 112 is stopped in the data retention period. Therefore, the controller 180 may stop the supply of the power source voltage GVDD to the gate driver 112 after stopping the supply of control signals (GSP and GCLK). In the data retention period, the supply of control signals (SSP and SCLK) to the source driver 113 is also stopped; thus, the power source voltage can also be stopped being supplied to the source driver 113. That is, the IDS driving makes it possible to achieve the LCD 100 that performs eye-friendly display at low power.

Note that in this specification, the phrase "a signal or voltage is not supplied to a wiring, a terminal, and the like" means that a signal or voltage that does not have a predetermined level for operating a circuit is applied to the wiring and the like, and/or the wiring and the like are brought into an electrically floating state.

In both the normal driving and the IDS driving, voltage supplied to the pixel 121 needs to be retained until the next data rewriting. This change in voltage leads to the degradation of display quality of the LCD 100. In the normal driving, data is rewritten at a frequency of 60 Hz or 120 Hz; thus, the pixel 121 is driven by alternate-current voltage. In contrast, the IDS driving can be regarded as pseudo direct current (DC) driving because a data retention period occupies most of the display period. Thus, in the IDS driving, as compared to the normal driving, a state in which a residual DC voltage is induced is kept for a long period, whereby localization of ionic impurities of liquid crystal or accumulation of residual charges at the interface between a liquid crystal layer and an alignment film is likely to be caused.

The residual DC voltage changes voltage retained in the pixel 121; as a result, transmittance of a liquid crystal cell is changed.

One method for suppressing a flicker is a method such as the IDS driving in which the number of data rewriting operations is reduced. However, in the case where a residual DC voltage exists in a liquid crystal cell, the amount of change in transmittance of the liquid crystal cell might be increased more in the IDS driving, which has a long data retention period, than in the normal driving. This causes another problem in which a flicker that occurs in data rewriting is easily observed in the IDS driving. This embodiment solves the problem.

In the LCD 100 in this embodiment, the potential of the common electrode 31 is made the same as that of the common electrode 32, whereby generation of a residual DC voltage by the IDS driving is suppressed. In other words, with the common electrodes 31 and 32 having the same potential, DC voltage components perpendicular to the substrate 21 (the common electrode 31) that are applied to the liquid crystal cell in the data retention period are reduced. Accordingly, accumulation of residual charges in the liquid crystal cell is suppressed, so that change in transmittance of the liquid crystal cell in the data retention period can be suppressed.

Suppression of change in transmittance in the liquid crystal cell suppresses a flicker at the time of rewriting data; accordingly, display that is less likely to make eyes tired can be performed in the LCD 100. Example 1 will show that the change in transmittance of the liquid crystal cell at the time of IDS driving is suppressed by making the common electrodes 31 and 32 the same potential so as to reduce a flicker.

Another factor of change in the transmittance of a liquid crystal cell is change in retention voltage that is caused by leakage of charges retained in the liquid crystal cell. Thus, in order to reduce the amount of change in voltage applied to the liquid crystal element 131, a transistor having an extremely low off-state current is preferably used as the transistor 130 and a material having high resistance is preferably used as a liquid crystal material for the liquid crystal layer 20.

<Transistor in Pixel>

The off-state current of a transistor refers to current flowing between a source and a drain of the transistor in an off state. The off state of an n-channel transistor refers to a state in which the gate voltage is sufficiently lower than the threshold voltage.

The off-state current of the transistor 130 is preferably as low as possible. Specifically, in the transistor 130, the off-state current per micrometer of channel width is preferably lower than or equal to 100 zA/μm. Because the off-state current is preferably as low as possible, the normalized off-state current is preferably lower than or equal to 10 zA/m, more preferably lower than or equal to 1 zA/μm, and still more preferably lower than or equal to 10 yA/μm.

To obtain such an extremely low off-state current, a channel of the transistor 130 may be formed using an oxide semiconductor that has a wider band gap (greater than or equal to 3.0 eV) than Si or Ge. Here, a transistor including a channel formed using an oxide semiconductor (OS) is referred to as an OS transistor.

By reducing impurities serving as electron donors, such as moisture or hydrogen, and also reducing oxygen vacancies, an i-type (intrinsic) or a substantially i-type oxide semiconductor can be obtained. Here, such an oxide semiconductor is referred to as a highly purified oxide semiconductor. When a highly purified oxide semiconductor is used for a channel, the normalized off-state current can be reduced to about several yoctoamperes per micrometer (yA/μm) to several zeptoamperes per micrometer (zA/μm).

An OS transistor preferably includes an oxide semiconductor containing at least indium (In) or zinc (Zn). The oxide semiconductor also preferably contains an element serving as a stabilizer for reducing a variation in electrical characteristics. Examples of such an element include Ga, Sn, Hf, Al, and Zr. Typical examples of the oxide semiconductor used for the OS transistor include an In—Ga—Zn-based oxide and an In—Sn—Zn-based oxide. The oxide semiconductor will be described in more detail in Embodiment 4.

<Liquid Crystal Material>

The resistance of the transistor 130 is preferably increased to reduce the amount of charge leaked through the transistor 130. Therefore, the specific resistivity of the liquid crystal material for the liquid crystal layer 20 is preferably greater than or equal to $1.0 \times 10^{13}$ Ω·cm, more preferably greater than or equal to $1.0 \times 10^{14}$ Ω·cm. For example, it is possible to use a liquid crystal material with a specific resistivity greater than or equal to $1.0 \times 10^{13}$ Ω·cm and less than or equal to $1.0 \times 10^{16}$ Ω·cm, preferably greater than or equal to $1.0 \times 10^{14}$ Ω·cm and less than or equal to $1.0 \times 10^{16}$ Ω·cm. Note that the specific resistivity of the liquid crystal material is measured at 20° C.

As described above, according to this embodiment, a low power LCD capable of performing display that is less likely to make eyes tired can be provided.

This embodiment can be combined with any of the other embodiments or an example as appropriate.

Embodiment 2

In this embodiment, another example of IDS driving will be described.

<IDS Driving>

In the IDS driving shown in FIG. 3B, data rewriting is regularly performed at a lower refresh rate than that of normal driving. In the case of displaying a still image, data rewriting can be suspended unless the displayed image is changed. Thus, a still image can be displayed by a driving method in which data rewriting is not regularly performed but is performed when the displayed image is changed. Here, this driving method is called second IDS driving, whereas the IDS driving in FIG. 3B is called first IDS driving. The second IDS driving will be described below with reference to FIGS. 5A and 5B.

Figure 5A:
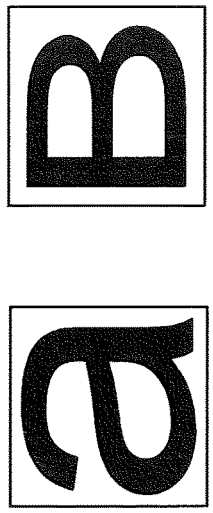
FIGS. 5A and 5B illustrate an example of IDS driving.
Figure 5B:
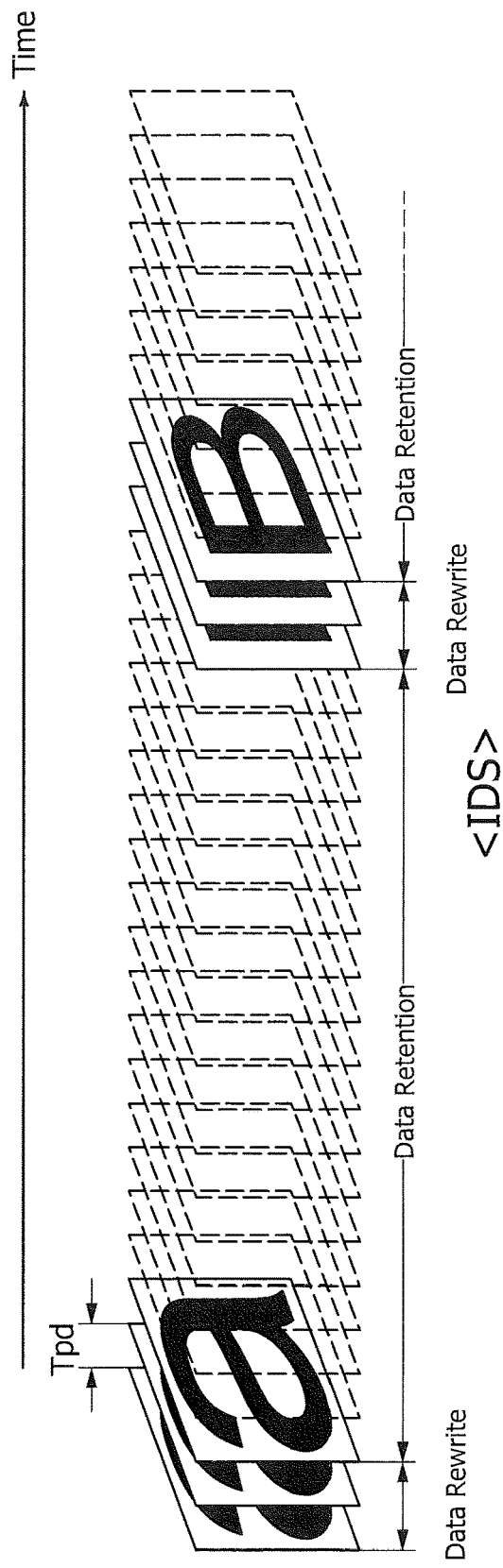

Here, a case illustrated in FIG. 5A where a still image IM1 is displayed and then a still image IM2 is displayed is described. As illustrated in FIG. 5B, by the IDS driving, image data of the still image IM1 is written to the pixel 121. Data rewriting can be performed in a similar manner to that of the first IDS driving. Data rewriting is performed once or more times at the same refresh rate (period Tpd) as that of the normal driving, so that data is written to the pixel 121. In an example of FIG. 5B, data rewriting is performed three times.

After data is written, data rewriting is stopped so that data is retained. In the second IDS driving, the data is retained until a displayed image is changed. Data rewriting for displaying the still image IM2 is performed in a similar manner to that for the still image IM1. Specifically, first, data rewriting is performed three times and then data rewriting is stopped so that data is retained.

Note that in order to perform screen switching from the still image IM1 to the still image IM2 smoothly, a moving image for screen switching from the still image IM1 to the still image IM2 may be displayed by the normal driving between the still image IM1 and the still image IM2.

In the LCD 100, one or both of the first and second IDS driving may be performed as LDS driving. Appropriate IDS driving can be selected depending on the intended use of a semiconductor device to which the LCD 100 is applied or components of the pixel 121 (e.g., an alignment film and liquid crystal).

This embodiment can be combined with any of the other embodiments or an example as appropriate.

Embodiment 3

In this embodiment, a more specific structure of an FFS liquid crystal panel will be described with reference to FIG. 6 and FIG. 7.

<<FFS LC Panel>>

Figure 6:
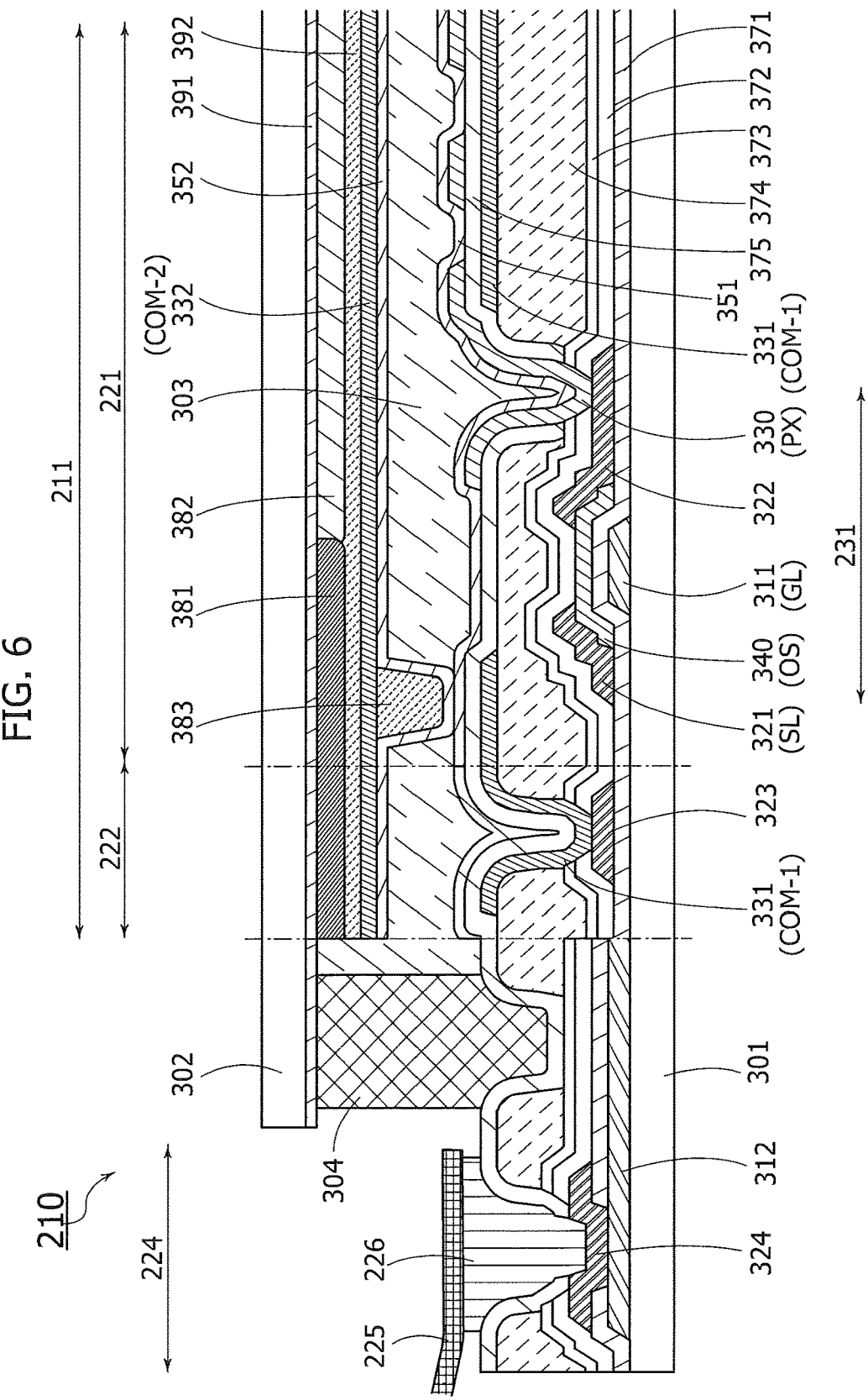
FIG. 6 is a cross-sectional view illustrating an example of an FFS LC panel.

FIG. 6 is a cross-sectional view illustrating one structural example of the LC panel 210. In the LC panel 210, as in the LC panel 110, a pixel portion and drivers (a gate driver and a source driver) are formed over the same substrate. Here, transistors included in these circuits are OS transistors. The OS transistors are n-channel transistors.

In FIG. 6, a pixel portion 211 and a terminal portion 224 are illustrated as typical components of the LC panel 210. A pixel 221 and a connection portion 222 for a common electrode 331 (COM-1) are illustrated as typical components of the pixel portion 211.

Figure 7:
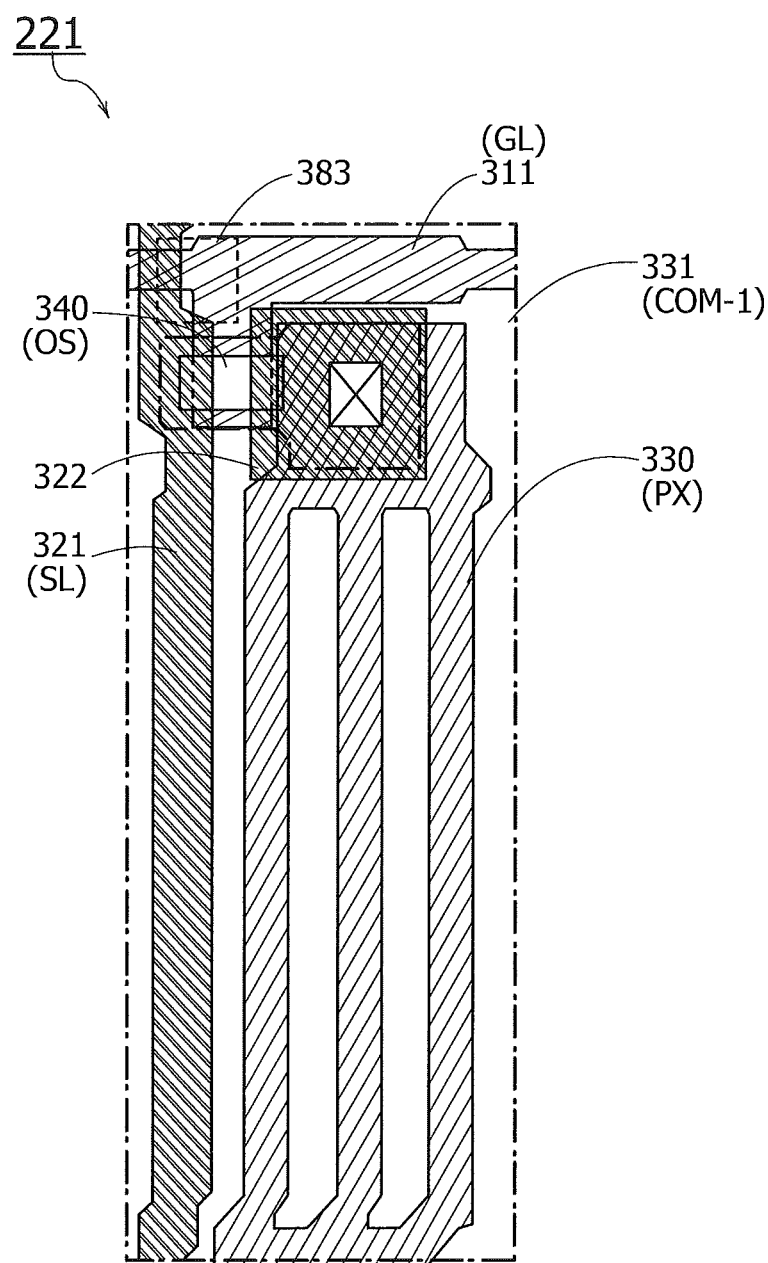
FIG. 7 is a layout view illustrating a structural example of a pixel of the LC panel in FIG. 6.

FIG. 7 is a layout view illustrating one structural example of the pixel 221. The circuit configuration of the pixel 221 is the same as that of the pixel 121 in FIG. 1A.

As illustrated in FIG. 6, a liquid crystal layer 303 sealed by the sealing member 304 is disposed between the substrate 301 and the substrate 302. The liquid crystal layer 303 preferably includes the aforementioned liquid crystal material with a specific resistivity greater than or equal to $1.0 \times 10^{13}$ Ω·cm.

The substrate 302 is provided with a spacer 383 as a component for maintaining a cell gap in the LC panel 210. As illustrated in FIG. 7, the spacer 383 is disposed in a region where the gate line 311 and the source line 321 overlap with each other. In such a region, the alignment of the liquid crystal material is disordered and thus the region does not contribute to display. By forming the spacer 383 in such a region, the aperture ratio of the pixel 221 can be increased. The spacer 383 may be provided over the substrate 301.

The terminal portion 224 including a plurality of terminals 324 is formed over a region of the substrate 301 on an outer side of the sealing member 304. These terminals 324 are connected to an FPC 225 through an anisotropic film 226. The terminals 324 are connected to a lead wiring 312.

An insulating layer 391 is formed on the surface of the substrate 302, a light-blocking layer 381 and a color filter layer 382 are formed on the insulating layer 391. The insulating layer 391 is formed using a silicon nitride film, for example. The light-blocking layer 381 and the color filter layer 382 are formed using a resin, for example. The light-blocking layer 381 is provided to cover a region of the pixel 221 that does not contribute to display, such as a wiring or an electrode.

An insulating layer 392 formed of a resin and the like is formed to cover the light-blocking layer 381 and the color filter layer 382. A common electrode 332 (COM-2) is formed on the insulating layer 392. The spacer 383 is formed on the common electrode 332. The spacer 383 can be formed using a photosensitive resin material. An alignment film 352 is formed to cover the common electrode 332 and the spacer 383. Like a counter electrode of a TN LCD panel, the common electrode 332 is connected to a terminal of a connection portion (common contact) formed in the substrate 301 by an anisotropic film. This terminal is connected to the terminal 324 in the terminal portion 224 through the lead wiring 312.

The transistor 231 includes the gate line (GL) 311, the source line (SL) 321, the electrode 322, and an oxide semiconductor (OS) layer 340. A pixel electrode 330 (PX) is connected to the electrode 322. The OS layer 340 includes at least one oxide semiconductor layer in which a channel is formed. An insulating layer 371 serves as a gate insulating layer of the transistor 231.

A transistor having a similar element structure to that of the transistor 231 is formed also in a driver.

In FIG. 6, the transistor 231 is a bottom-gate transistor, though it may be a top-gate transistor. Alternatively, the transistor 231 may be a dual-gate transistor in which two gate electrodes are disposed with a channel interposed therebetween. The dual-gate OS transistor can have improved current-drive characteristics. In a driver, some of the transistors may be dual-gate transistors and the others may be bottom-gate or top-gate transistors in accordance with its intended use.

The common electrode 331 (COM-1) is provided to face the pixel electrode 330 with an insulating layer 375 therebetween. The pixels 221 are each provided with one pixel electrode 330; in contrast, the common electrode 331 is formed of one conductive film and shared by all of the pixels 221. As illustrated in FIG. 6 and FIG. 7, the pixels 221 are each provided with an opening which is formed in the common electrode 331 and in which the transistor 231 and the pixel electrode 330 are connected.

The electrodes (330 to 332) are formed of a conductive film having a light-transmitting property. As the conductive material having a light-transmitting property, indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, indium tin oxide to which silicon oxide is added, and the like may be given. A film formed of any of these conductive materials can be formed by a sputtering method.

As a wiring and an electrode in the first layer, in addition to the gate line 311, the lead wiring 312 and the like are formed. The insulating layer 371 is formed to cover the wiring and electrode (311 and 312) in the first layer.

The OS layer 340 is formed over the insulating layer 371. The wirings and electrodes (321 to 324) in the second layer are formed over the insulating layer 371 and the OS layer 340. The wiring 323 is a wiring for connecting the common electrode 331 to the lead wiring 312. Before the wirings and electrodes (321 to 324) in the second layer are formed, openings for exposing the lead wiring 312 are formed in the insulating layer 371. The wiring 323 and the terminal 324 are connected to the lead wiring 312 in these openings.

Insulating layers 372 and 373 formed of inorganic materials are formed to cover the wirings and electrodes (321 to 324) in the second layer. After openings for exposing the wirings and electrodes (322 to 324) in the second layer are formed in the insulating layers 372 and 373, an insulating layer 374 formed of, for example, a resin material is formed. With use of a photosensitive resin material, the insulating layer 374 having openings can be formed without an etching step. In the insulating layer 374, in addition to openings for connection, an opening in which the sealing member 304 is to be formed is formed.

The common electrode 331 is formed over the insulating layer 374. The insulating layer 375 is formed to cover the common electrode 331. Openings for exposing the wirings and electrodes (322 to 324) in the second layer are formed in the insulating layer 375. The pixel electrode 330 is formed over the insulating layer 375, and an alignment film 351 is formed to cover the pixel electrode 330. A region where the pixel electrode 330 overlaps with the common electrode 331 with the insulating layer 375 therebetween serves as an auxiliary capacitor of a liquid crystal element.

For example, as a substrate that can be used as the substrates 301 and 302, a non-alkali glass substrate, a barium borosilicate glass substrate, an aluminoborosilicate glass substrate, a ceramic substrate, a quartz substrate, a sapphire substrate, a metal substrate, a stainless-steel substrate, a plastic substrate, a polyethylene terephthalate substrate, a polyimide substrate, or the like can be used.

The substrates 301 and 302 do not have to be supporting substrates (e.g., glass substrates) used for forming the pixel 221, the common electrode 332, and the like. After the pixel 221 and the like are formed, supporting substrates are separated, and flexible substrates may be attached with adhesive layers. A typical example of each of the flexible substrates is a plastic substrate. In addition, a thin glass substrate with a thickness of greater than or equal to 50 μm and less than or equal to 500 μm, or the like can be used. The use of flexible substrates as the substrates 301 and 302 enables the LC panel 210 to be bent.

The wirings and electrodes (311, 312, and 321 to 324) in the first and second layers can each be formed using one or more conductive films. Such conductive films are metal films containing aluminum, chromium, copper, silver, gold, platinum, tantalum, nickel, titanium, molybdenum, tungsten, hafnium, vanadium, niobium, manganese, magnesium, zirconium, beryllium, and the like. Such conductive films can be an alloy film containing any of the metal as a component, a compound film containing any of the metal as a component, or a polycrystalline silicon film containing an impurity element such as phosphorus, or the like.

The insulating layers (371 to 375, 391, and 392) can each be formed using one or more insulating films. Examples of an inorganic insulating film include an aluminum oxide film, a magnesium oxide film, a silicon oxide film, a silicon oxynitride film, a silicon nitride oxide film, a silicon nitride film, a gallium oxide film, a germanium oxide film, a yttrium oxide film, a zirconium oxide film, a lanthanum oxide film, a neodymium oxide film, a hafnium oxide film, and a tantalum oxide film. These insulating films can be formed by a sputtering method, a CVD method, an MBE method, an ALD method, or a PLD method. Examples of a resin film that can be used for the insulating layers include an organic resin film of an acrylic resin, a polyimide resin, a benzocyclobutene-based resin, a siloxane-based resin, a polyamide resin, an epoxy resin, or the like can be formed. Note that in this specification, an oxynitride refers to a substance that contains more oxygen than nitrogen, and a nitride oxide refers to a substance that contains more nitrogen than oxygen.

This embodiment can be combined with any of the other embodiments or an example as appropriate.

Embodiment 4

An oxide semiconductor used for a channel of an OS transistor will be described in this embodiment.

Examples of the oxide semiconductor used for the OS transistor include indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

An OS transistor preferably includes an oxide semiconductor containing at least indium (In) or zinc (Zn). The oxide semiconductor also preferably contains an element serving as a stabilizer for reducing a variation in electrical characteristics. Examples of such an element include Ga, Sn, Hf, Al, and Zr. Typical examples of the oxide semiconductor used for the OS transistor include an In—Ga—Zn-based oxide and an In—Sn—Zn-based oxide.

Here, an "In—Ga—Zn-based oxide" means an oxide containing In, Ga, and Zn as its main components and there is no limitation on the ratio of In to Ga and Zn. The In—Ga—Z-based oxide may contain another metal element in addition to In, Ga, and Zn.

Alternatively, a material represented by $InMO_3(ZnO)_m$ (m>0) may be used as an oxide semiconductor. Note that M represents one or more metal elements selected from Ga, Fe, Mn, and Co, or the above element as a stabilizer. Still alternatively, a material represented by $In_2SnO_5(ZnO)_n$ (n>0) may be used as the oxide semiconductor.

For example, an In—Ga—Zn-based oxide in which an atomic ratio of In to Ga and Zn is 1:1:1, 1:3:2, 3:1:2, or 2:1:3, or an oxide whose composition is in the neighborhood of the above compositions may be used.

When an oxide semiconductor film contains a large amount of hydrogen, the hydrogen and an oxide semiconductor are bonded to each other, so that part of the hydrogen serves as a donor to generate an electron that is a carrier. As a result, the threshold voltage of the OS transistor shifts in the negative direction. It is thus preferable that, after the formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferable that oxygen be added to the oxide semiconductor film to fill oxygen vacancies increased by the dehydration treatment (dehydrogenation treatment). Here, supplying oxygen to an oxide semiconductor film may be expressed as oxygen adding treatment or treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$, or lower than or equal to $1\times10^{13}/cm^3$.

A structure of the oxide semiconductor film will be described below.

The oxide semiconductor film may be a single-crystal oxide semiconductor film or a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

An oxide semiconductor film of an OS transistor may be a single-layer film or a layered film including two or more films of an amorphous oxide semiconductor film, a microcrystalline oxide semiconductor film, and a CAAC-OS film, for example.

The amorphous oxide semiconductor film has disordered atomic arrangement and no crystalline component. For example, the amorphous oxide semiconductor film does not have a specific state as in quartz. In the high-resolution TEM image of the amorphous oxide semiconductor film, crystal parts cannot be found. When the amorphous oxide semiconductor film is subjected to structural analysis by an out-of-plane method with an XRD apparatus, a peak that shows a crystal plane does not appear. A halo pattern is shown in an electron diffraction pattern of the amorphous oxide semiconductor film. Further, a halo pattern is shown but a spot is not shown in a nanobeam electron diffraction pattern of the amorphous oxide semiconductor film.

In the high-resolution TEM image of the microcrystalline oxide semiconductor film, there are a region where a crystal part is clearly observed and a region where a crystal part is not observed. In most cases, the size of a crystal part in the microcrystalline oxide semiconductor film is greater than or equal to 1 nm and less than or equal to 100 nm, or greater than or equal to 1 nm and less than or equal to 10 nm, for example. An oxide semiconductor film including nanocrystal (nc) that is a microcrystal with a size greater than or equal to 1 nm and less than or equal to 10 nm is specifically referred to as a nanocrystalline oxide semiconductor (nc-OS) film. In a high resolution TEM image of the nc-OS film, a grain boundary cannot be found clearly in the nc-OS film sometimes for example. The nc-OS film has a higher degree of atomic order than the amorphous oxide semiconductor film. Therefore, the nc-OS film has a lower density of defect states than an amorphous oxide semiconductor film. Note that there is no regularity of crystal orientation between different crystal parts in the nc-OS film. Thus, the nc-OS film has a higher density of defect states than the CAAC-OS film.

The CAAC-OS film is one of oxide semiconductor films having a plurality of c-axis aligned crystal parts. The CAAC-OS film will be described in detail below.

When a combined analysis image (also referred to as a high-resolution TEM image) of a bright-field image and a diffraction pattern of the CAAC-OS film is observed by a transmission electron microscope (TEM), a plurality of crystal parts are seen. However, a boundary between crystal parts, that is, a grain boundary is not clearly observed even in the high-resolution TEM image. Thus, in the CAAC-OS film, a reduction in electron mobility due to the grain boundary is less likely to occur.

In the high-resolution cross-sectional TEM image of the CAAC-OS film observed in a direction substantially parallel to the sample surface, metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

In the high-resolution plan-view TEM image of the CAAC-OS film observed in a direction substantially perpendicular to the sample surface, metal atoms arranged in a triangular or hexagonal configuration are seen in the crystal parts. However, there is no regularity in arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears when the diffraction angle (2θ) is around 31°. Since this peak is derived from the (009) plane of the InGaZnO$_4$ crystal, it can also be confirmed that crystals in the CAAC-OS film have c-axis alignment and that the c-axes are aligned in a direction substantially perpendicular to the formation surface or the top surface of the CAAC-OS film.

Note that the crystal part is formed concurrently with deposition of the CAAC-OS film or is formed through crystallization treatment such as heat treatment. As described above, the c-axes of the crystal part are aligned in a direction parallel to a normal vector of a formation surface or a normal vector of a top surface. Thus, for example, in the case where the shape of the CAAC-OS film is changed by etching or the like, the c-axes of the crystal part might not be necessarily parallel to a normal vector of a formation surface or a normal vector of a top surface of the CAAC-OS film.

The degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Furthermore, when an impurity is added to the CAAC-OS film, the crystallinity in a region to which the impurity is added is changed, and the degree of crystallinity in the CAAC-OS film varies depending on regions.

Note that when the CAAC-OS film including an InGaZnO$_4$ crystal is analyzed by an out-of-plane method, a peak of 2θ may also be observed at around 36°, in addition to the peak of 2θ at around 31°. The peak of 2θ at around 36° is derived from the (311) plane of a ZnGa$_2$O$_4$ crystal; such a peak indicates that a ZnGa$_2$O$_4$ crystal is included in part of the CAAC-OS film including the InGaZnO$_4$ crystal. It is preferable that in the CAAC-OS film, a peak of 2θ appear at around 31° and a peak of 2θ do not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has a negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor that includes the oxide semiconductor film having high impurity concentration and a high density of defect states has unstable electrical characteristics in some cases.

A transistor using the CAAC-OS film has little variation in electrical characteristics due to irradiation with visible light or ultraviolet light, and thus, the transistor has high reliability.

In the description of a crystal structure, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly includes the case where the angle is greater than or equal to 85° and less than or equal to 95°.

For example, a CAAC-OS film is deposited by a sputtering method using a polycrystalline metal oxide target. When ions collide with the target, a crystal region included in the target might be separated from the target along the a-b plane, and a sputtered particle having a plane parallel to the a-b plane (flat-plate-like or pellet-like sputtered particle) might be separated from the target. In that case, the flat-plate-like or pellet-like sputtered particle reaches a substrate while maintaining its crystal state, so that the CAAC-OS film can be deposited.

For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, or nitrogen) that exist in a treatment chamber may be reduced. The concentration of impurities in a deposition gas may also be reduced. Specifically, a deposition gas whose dew point is −80° C. or lower, preferably −100° C. or lower is used.

By increasing the substrate heating temperature during the deposition, when the flat-plate-like or pellet-like sputtered particle reaches the substrate, migration occurs on the substrate surface, so that a flat plane of the sputtered particle is attached to the substrate. For example, the substrate heating temperature during the deposition may be higher than or equal to 100° C. and lower than or equal to 740° C., preferably higher than or equal to 200° C. and lower than or equal to 500° C.

Furthermore, it is preferable to reduce plasma damage during the deposition by increasing the proportion of oxygen in the deposition gas and optimizing power. The proportion of oxygen in the deposition gas is higher than or equal to 30 vol %, preferably 100 vol %.

This embodiment can be combined with any of the other embodiments or an example as appropriate.

Embodiment 5

In this embodiment, an electronic device that includes an LCD for its display portion will be described. With use of Embodiments 1 to 4, a low power electronic device that can perform eye-friendly display can be provided.

<<Configuration Example of Information Processing System>>

Figure 8:
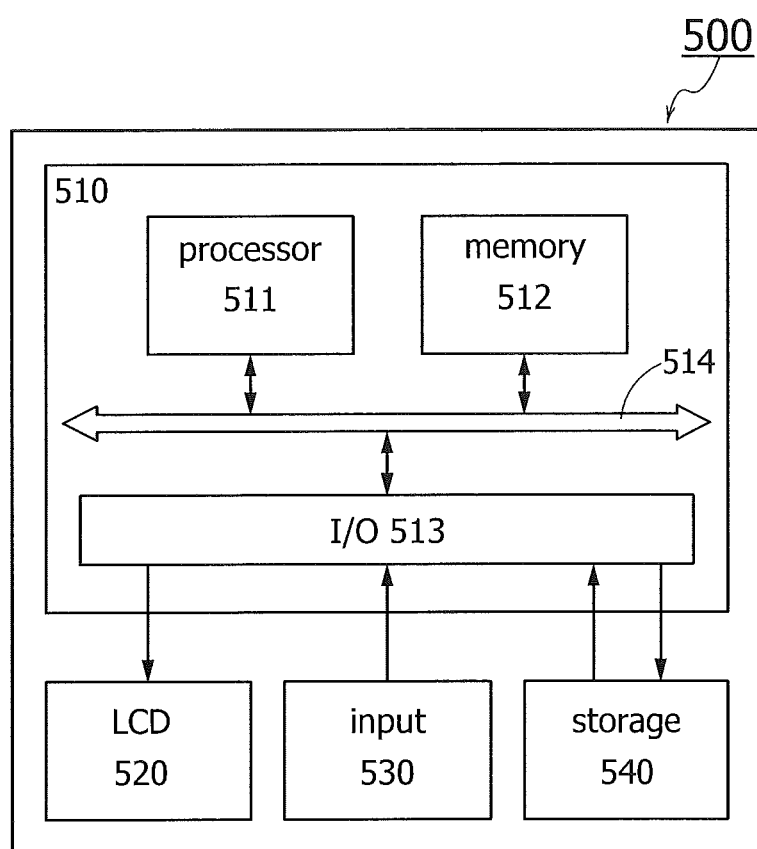
FIG. 8 is a block diagram illustrating an example of a configuration of an information processing system.

FIG. 8 is a block diagram illustrating an example of a configuration of the information processing system in this embodiment. An information processing system 500 includes an arithmetic unit 510, a liquid crystal display device (LCD) 520, an input unit 530, and a storage unit 540.

The arithmetic unit 510 has a function of controlling the whole information processing system 500. The arithmetic unit 510 includes a processor 511, a memory unit 512, an input/output (I/O) interface 513, and a bus 514. Via the bus 514, the processor 511, the memory unit 512, and the I/O interface 513 are connected to each other. The arithmetic unit 510 communicates with the LCD 520, the input unit 530, and the storage unit 540 via the I/O interface 513. For example, a signal input to the input unit 530 is transferred to the processor 511 or the memory unit 512 via the I/O interface 513 and the bus 514.

Data (including programs) that is necessary for processing of the processor 511 and data that is input via the I/O interface 513 are retained in the memory unit 512.

The processor 511 executes a program to operate the information processing system 500. The processor 511 performs some processing such as analyzing a signal input to the input unit 530, reading data from the storage unit 540, writing data to the memory unit 512 and the storage unit 540, or generating a signal output to the LCD 520.

The LCD 520 is provided as an output unit and constitutes a display portion of the information processing system 500. The information processing system 500 may include another output unit such as a speaker or a printer in addition to the display unit.

Data is input to the arithmetic unit 510 from the input unit 530. A user can operate the information processing system 500 by operating the input unit 530. Various human interface devices can be used as the input unit 530, and the information processing system 500 may include a plurality of input units. Examples of the input unit 530 include a touch panel, a keyboard, and an operation button that can be operated by a user directly so as to operate the information processing system 500. The information processing system 500 may be operated with another input unit including a device that senses sound, eye movement, gesture, or the like, e.g., with a microphone or a camera (imaging system).

Various data such as programs or image signals are retained in the storage unit 540. The capacitance of the storage unit 540 is larger than that of the memory unit 512. Examples of the storage unit 540 include a flash memory, a DRAM, and a hard disc drive (HDD). The storage unit 540 may be provided as needed.

The information processing system 500 may be a device in which all the units such as the arithmetic unit 510 are incorporated in a housing or a device in which some units are connected to the arithmetic unit 510 via wires or wirelessly. Examples of the former device include a laptop personal computer (PC), a tablet PC (terminal), an e-book reader (terminal), and a smartphone. Examples of the latter device include a set of a desk-top PC, a keyboard, a mouse, and a monitor.

The LCD 520 in the information processing system 500 can perform display by the normal driving and the IDS driving. In the case of performing the IDS driving, one or both of the first and second IDS driving is performed. Examples of a preferable use of the information processing system 500 that performs still image display by the second IDS driving (see FIGS. 5A and 5B) are reading an electronic book and seeing photographs taken by a digital camera. In other words, in the case of using the information processing system 500 under the conditions where the same image is displayed for a relatively long period and display of the whole screen is changed by users' operation, a still image is preferably displayed by the second DS driving.

Some specific examples of the information processing system 500 will be described with reference to FIGS. 9A to 9F. FIGS. 9A to 9F are external views illustrating examples of the information processing system including an LCD in a display portion.

Figure 9A:
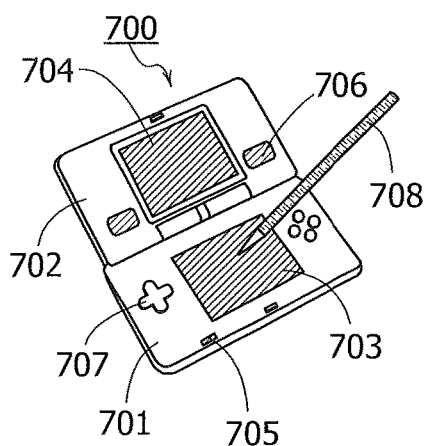
FIGS. 9A to 9F are each an external view illustrating a specific example of an information processing system.

FIG. 9A illustrates a portable game machine 700, which includes a housing 701, a housing 702, a display portion 703, a display portion 704, a microphone 705, speakers 706, a control key 707, a stylus 708, and the like. The display portion 703 and/or the display portion 704 may include a touch panel as the input unit 530.

Figure 9B:
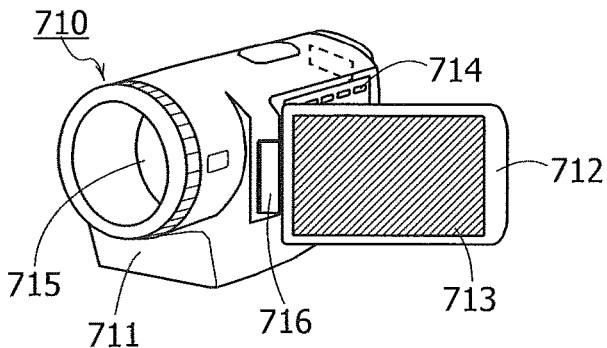

A video camera 710 in FIG. 9B includes a housing 711, a housing 712, a display portion 713, operation keys 714, a lens 715, a joint 716, and the like. The operation keys 714 and the lens 715 are provided in the housing 711, and the display portion 713 is provided in the housing 712. The housings 711 and 712 are connected to each other with the joint 716, and the angle between the housings 711 and 712 can be changed with the joint 716. An image on the display portion 713 may be switched depending on the angle between the housings 711 and 712 at the joint 716. The display portion 713 may include a touch panel.

Figure 9C:
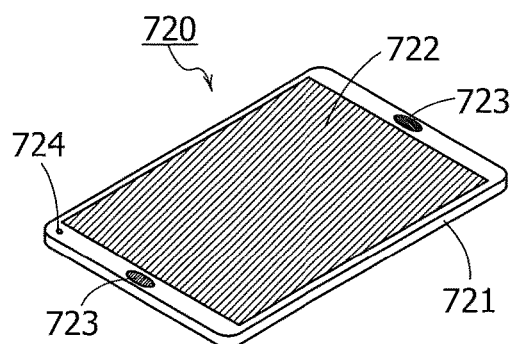

A tablet 720 in FIG. 9C includes a display portion 722 incorporated in a housing 721, an operation button 723, and a speaker 724. In addition, although not illustrated, the tablet 720 includes a microphone, a stereo headphone jack, a memory card insertion slot, a camera, an external connection port such as a USB connector, and the like. The display portion 722 includes a touch panel as the input unit 530.

Figure 9D:
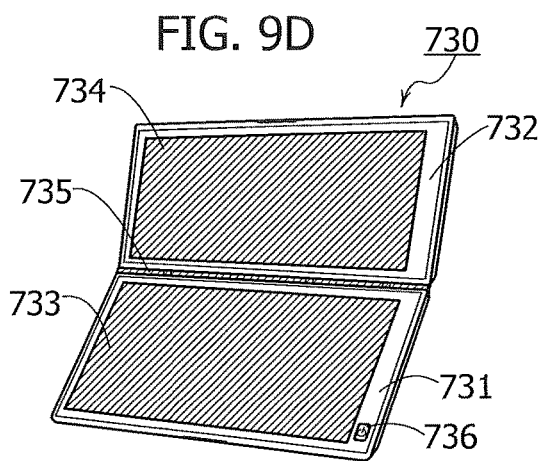

A foldable tablet 730 illustrated in FIG. 9D includes a housing 731, a housing 732, a display portion 733, a display portion 734, a connection portion 735, an operation button 736, and the like. The display portions 733 and 734 each include the LCD 520. The display portions 733 and 734 each include a touch panel as the input unit 530.

Figure 9E:
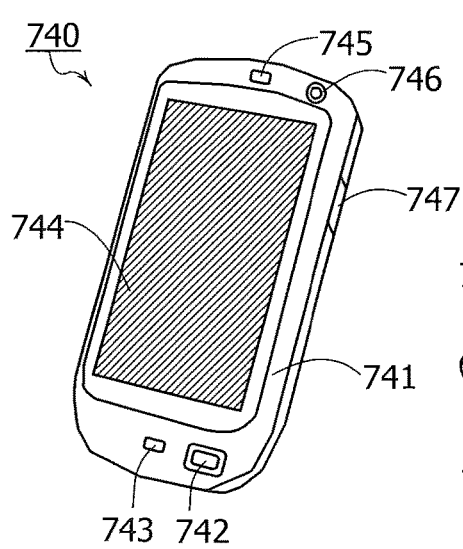

A smartphone 740 illustrated in FIG. 9E includes a housing 741, an operation button 742, a microphone 743, a display portion 744, a speaker 745, a camera lens 746, and the like. Since the camera lens 746 is provided on the same plane where the display portion 744 is provided, videophone is possible. The display portion 744 includes a touch panel as the input unit 530.

Figure 9F:
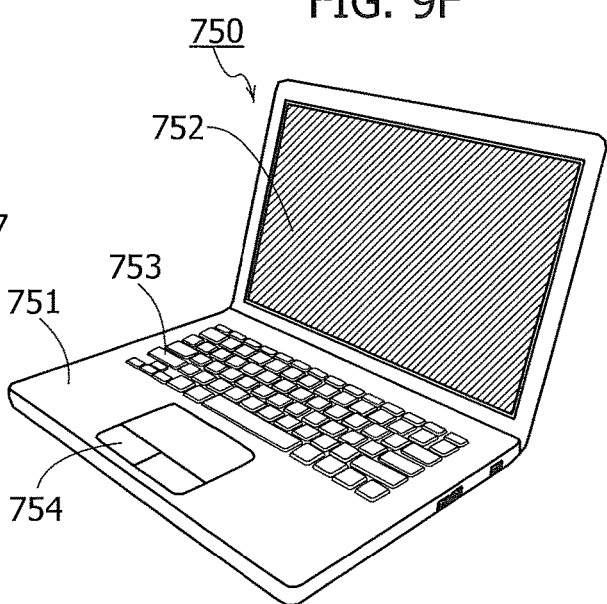

A laptop personal computer 750 illustrated in FIG. 9F includes a housing 751, a display portion 752, a keyboard 753, a pointing device 754, and the like. The display portion 752 includes the LCD 520. The display portion 752 may also include a touch panel as the input unit 530.

This embodiment can be combined with any of the other embodiments or an example as appropriate.

Example 1

<Specifications of LC Panel>

An FFS LC panel described in Embodiment 3 (see FIG. 6 and FIG. 7) was fabricated, and the operation was examined. Table 1 shows the specifications of the fabricated LC panel (hereinafter, referred to as a test panel). In the actual examination, a backlight module and the like were incorporated into the test panel, and the test panel was operated as a transmissive LCD.

TABLE 1

| | |
|---|---|
| Liquid crystal mode | Fringe field switching |
| Liquid crystal material | Negative liquid crystal |
| Screen size | 3.64 inch |
| Pixel density | 326 ppi |
| Resolution | 540 × RGB (H) × 960 (V): Quarter HD |
| Pixel pitch | 26 μm (H) × 78 μm (V) |

Two substrates of the test panel were glass substrates. A gate driver and a source driver were formed over one element substrate together with a pixel portion. The fabricated transistor was an OS transistor, and its oxide semiconductor layer was formed using an In—Ga—Zn-based oxide film having a CAAC structure.

<<Evaluation of Test Panel>>

The common voltage VCOM of the test panel (voltage of the common electrode COMA) was set to 0 V. The voltage VCOM2 of the common electrode COM-2 was also set to 0 V, the test panel was operated while the common electrode COM-1 and the common electrode COM-2 have the same potential, and objective evaluation and subjective evaluation of a flicker were performed.

As Comparative Example 1, the test panel was operated while there was a potential difference between the common electrode COM-1 and the common electrode COM-2, and the same evaluation was performed. In Comparative Example 1, VCOM2 was set to −1.7 V and VCOM was set to a constant voltage in the range between −1.8 V and −1.7 V. The value of VCOM varied depending on the test panel and was determined so as to optimize display of an intermediate gray level.

<Measurement of Transmittance>

As objective evaluation, the transmittance of the test panel was measured. A gray still image was displayed on the test panel by the IDS driving. The refresh rate was 1 Hz. That is, data was rewritten every second. In the IDS driving, data was written three times for one screen rewriting (see FIG. 3B and FIG. 4B). The same applies to the subjective evaluation described below.

Figure 10A:
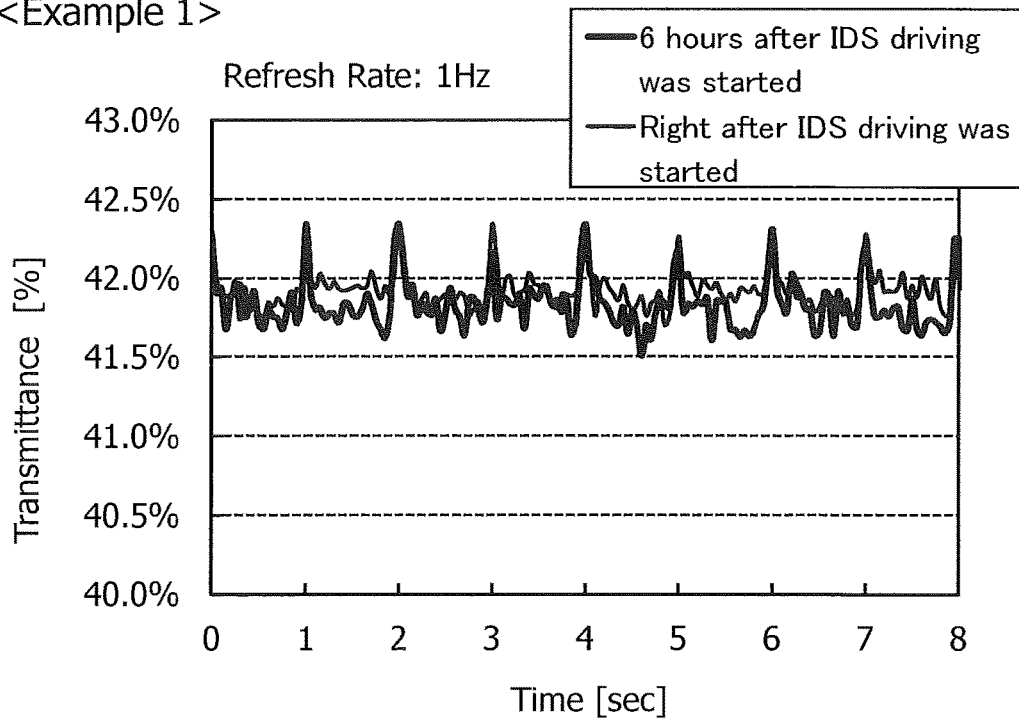
FIGS. 10A and 10B are graphs showing measurement results of the amount of change in transmittance in LCDs of Example 1 and Comparative Example 1, respectively.
Figure 10B:
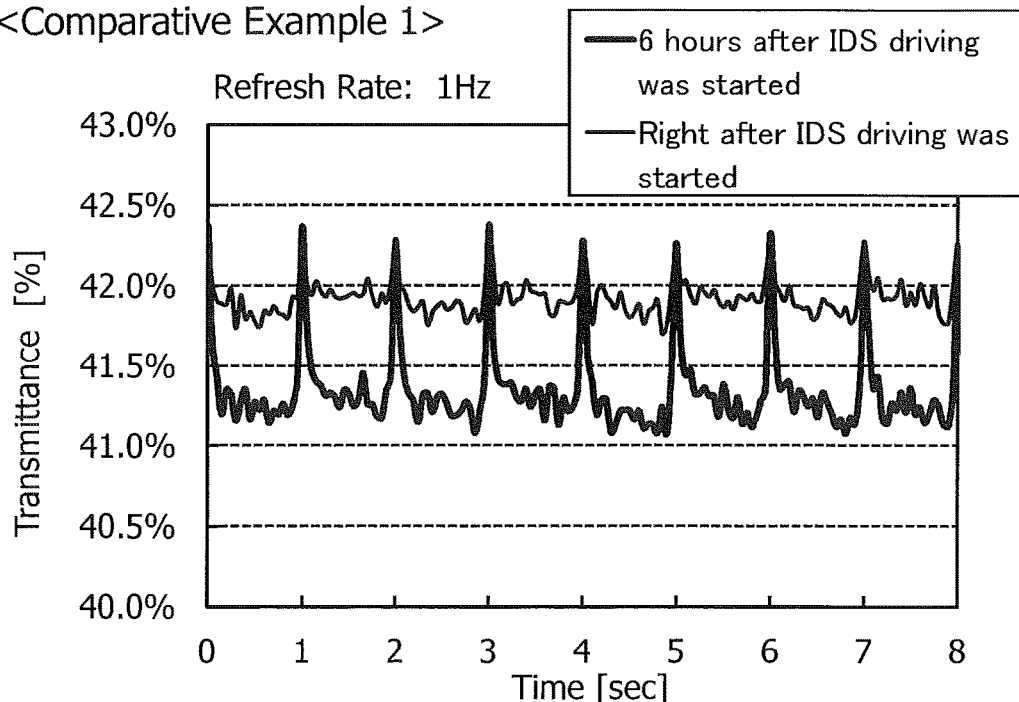

In both Example 1 and Comparative Example 1, the transmittance was measured right after and six hours after the IDS driving was started. FIGS. 10A and 10B show the measurement results. FIG. 10A is a graph showing change in transmittance of Example 1, and FIG. 10B is a graph showing change in transmittance of Comparative Example 1.

As shown in FIG. 10B, in Comparative Example 1, after six hours driving, the test panel does not have the transmittance measured right after the IDS driving was started, and the transmittance measured six hours after the IDS driving was started is lower than that measured right after the IDS driving was started by 1% or more. On the other hand, as shown in FIG. 10A, in Example 1, even after six hour continuous IDS driving, the amount of change in transmittance is almost the same as that in the transmittance measured right after the IDS driving was started.

According to FIGS. 10A and 10B, a change in transmittance of an FFS LCD is caused by a potential difference between the common electrodes COM-1 and COM-2. By making the two common electrodes (COM-1 and COM-2) have the same potential, a change in transmittance is suppressed even after the long time IDS driving. Because the IDS driving is pseudo DC driving, when the IDS driving is performed for several hours continuously with a potential difference between the two common electrodes (COM-1 and COM-2), charges are segregated in a liquid crystal cell, which can be a cause of changing the transmittance.

In the general voltage-transmittance (V-T) characteristics of an LCD, the amount of change in transmittance with respect to voltage is larger in the case of intermediate gray levels (gray display) than in the case of low gray levels (black display) or high gray levels (white display). According to FIG. 10A, Example 1 can suppress a change in transmittance in the case where a gray image is displayed by the IDS driving. In other words, it was confirmed that a natural image expressed by an intermediate gray level can be displayed with high quality even in the IDS driving by making the two electrodes (COM-1 and COM-2) have the same potential.

<Subjective Evaluation of Flicker>

Figure 11A:
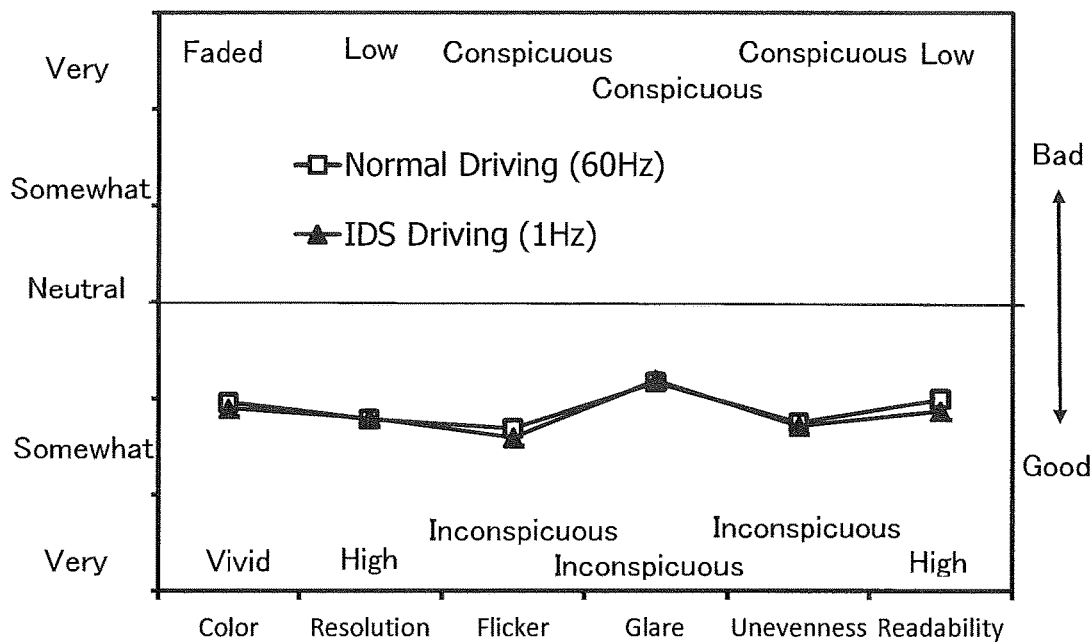
FIGS. 11A and 11B are graphs showing measurement results of subjective evaluation of the display quality of the LCDs of Example 1 and Comparative Example 1, respectively.
Figure 11B:
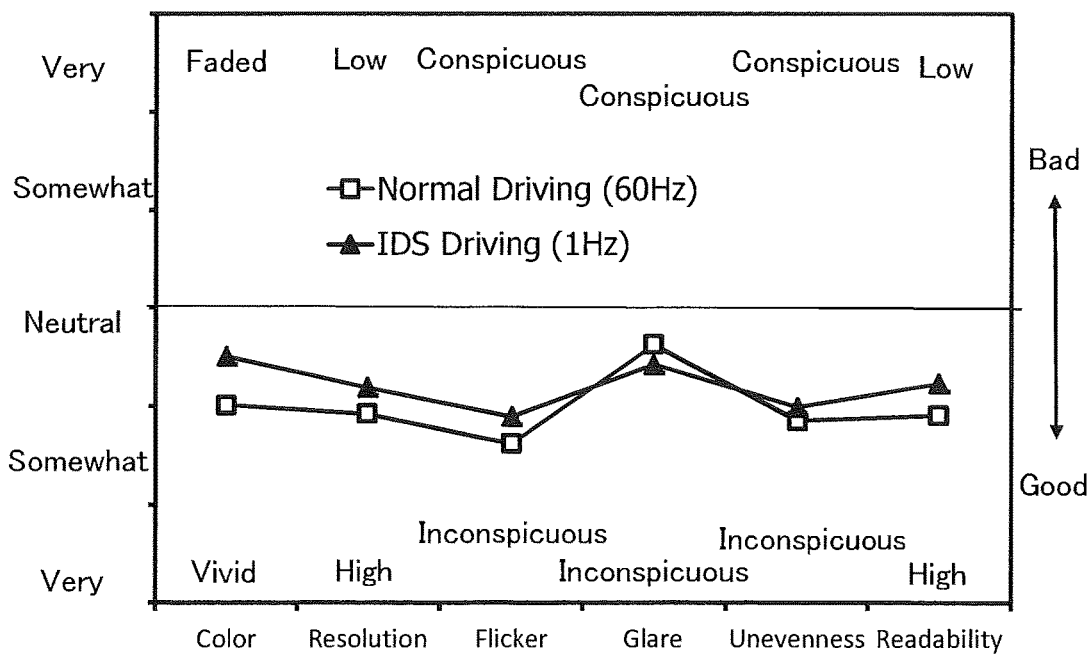

It was confirmed by this subjective evaluation that a flicker recognized by human eyes can be reduced by adjusting the potential difference between the common electrodes COM-1 and COM-2. FIGS. 11A and 11B show the results of subjective evaluation of Example 1 and Comparative Example 1.

For the subjective evaluation, two test panels were prepared: one was driven by the normal driving (the refresh rate was 60 Hz) and the other was driven by the IDS driving (the refresh rate was 1 Hz). Without being informed which driving mode was used, examinees compared two screens of the test panels and evaluated each display quality.

In order to prevent the examinees from having preconception of the evaluation purpose, some evaluation items regarding the display quality were prepared in addition to "flicker". The evaluation items were "flicker", "color", "resolution", "glare (reflection) on a screen", "display unevenness", and "readability of the text". Examinees evaluated each of the evaluation items on a five-point scale of "very good", "somewhat good", "neutral", "somewhat bad", and "very bad".

For the evaluation, twenty still images (thirteen kinds of natural images of animals, scenery, and the like and seven kinds of text images in alphabet and hiragana) were used. Each of these still images was displayed on the test panels for five seconds in a slide show mode. In both Example 1 and Comparative Example 1, the two test panels were operated for six hours continuously. The timing for evaluation varies among examinees during the six hours; thus, the period between the time when the operation of the test panels was started and the time when evaluation was performed varies depending on the examinee. Table 2a shows breakdown of the examinees for Example 1, and Table 2b shows breakdown of the examinees for Comparative Example 1.

TABLE 2

| (a) Example 1 | | | | (b) Comparative Example 1 | | | |
|---|---|---|---|---|---|---|---|
| Gender | | Generation | | Gender | | Generation | |
| Men | 34 | Twenties | 45 | Men | 27 | Twenties | 40 |
| Women | 52 | Thirties | 34 | Women | 57 | Thirties | 38 |
| Total | 86 | Forties | 7 | Total | 84 | Forties | 5 |
| | | | | | | Fifties | 1 |

As shown in FIG. 11A, the difference in the evaluation results with regard to a flicker between the normal driving and the IDS driving is small in Example 1. Among eighty-six examinees, three answered that they recognized a flicker more in the IDS driving and six answered that they recognized a flicker more in the normal driving. As to overall evaluation results of Example 1, a flicker was less recognized in the IDS driving than in the normal driving.

As shown in FIG. 11B, the difference in the evaluation results with regard to a flicker between the display modes is greater in Comparative Example 1 than in Example 1. Among eighty-four examinees, eleven answered that they recognized a flicker more in the IDS driving and three answered that they recognized a flicker more in the normal driving. As to overall evaluation results of Comparative Example 1, a flicker was recognized more significantly in the IDS driving than in the normal driving. As the elapsed time from start of the test becomes longer, a flicker was recognized more significantly in the IDS driving. These results of the subjective evaluation of Comparative Example 1 correspond to the results of the objective evaluation in FIG. 10B, that is, an increase in the amount of change in transmittance with time.

As described above, it was confirmed that a change in transmittance was able to be suppressed by making the two common electrodes (COM-1 and COM-2) have the same potential even when the IDS driving, which was pseudo DC driving, was performed for a long period. It was also confirmed that a flicker caused when data was rewritten in the IDS driving was able to be reduced.

The results of the subjective evaluation in 11A and 11B show that in Example 1, there is no significant difference in evaluation results of display quality between the IDS driving and the normal driving, whereas in Comparative Example 1, the display quality is degraded more in the IDS driving than in the normal driving. This suggests that display quality equivalent to that in the normal driving can be maintained even in an LCD after the long time IDS driving by making the two common electrodes (COM-1 and COM-2) have the same potential.

This application is based on Japanese Patent Application serial no. 2013-154170 filed with Japan Patent Office on Jul. 25, 2013, the entire contents of which are hereby incorporated by reference.

What is claimed is:

1. A liquid crystal display device comprising:
   a substrate;
   a pixel portion comprising a pixel, the pixel comprising:
      a first electrode over the substrate;
      an insulating layer over the first electrode;
      a second electrode over the insulating layer;
      a liquid crystal layer over the second electrode; and
      a third electrode over the liquid crystal layer,
   a driver circuit electrically connected to the pixel portion; and
   a controller electrically connected to the driver circuit,
   wherein the first electrode is electrically connected to the third electrode,
   wherein the controller is configured to select a first driving mode and a second driving mode,
   wherein the controller is configured to rewrite an image data input to the pixel every first period in the first driving mode,
   wherein the controller is configured to stop supplying of control signals to the driver circuit for a second period in the second driving mode,
   wherein the second period is longer than the first period, and
   wherein the first electrode and the third electrode are supplied with a same potential.

2. The liquid crystal display device according to claim 1, wherein the first driving mode is a mode for displaying a moving image, and
   wherein the second driving mode is a mode for displaying a still image.

3. The liquid crystal display device according to claim 1, further comprising a transistor electrically connected to the second electrode,
   wherein a channel of the transistor comprises an oxide semiconductor.

4. The liquid crystal display device according to claim 3, wherein a band gap of the oxide semiconductor is greater than or equal to 3.0 eV.

5. The liquid crystal display device according to claim 3, wherein an off-state current of the transistor per micrometer of a channel width is lower than or equal to 100 zA/μm.

6. The liquid crystal display device according to claim 1, wherein a polarity of a signal input to the pixel is inverted every first period in the first driving mode.

7. The liquid crystal display device according to claim 1, wherein the pixel portion comprises a plurality of pixels,
   wherein the first electrode and the plurality of pixels overlap each other, and
   wherein the second electrode and the plurality of pixels overlap each other.

8. An electronic device comprising the liquid crystal display device according to claim 1 in a display portion.

9. A liquid crystal display device comprising:
   a substrate;
   a pixel portion comprising a pixel, the pixel comprising:
      a first electrode over the substrate;
      an insulating layer over the first electrode;
      a second electrode over the insulating layer;
      a liquid crystal layer over the second electrode; and
      a third electrode over the liquid crystal layer,
   a driver circuit electrically connected to the pixel portion;
   a controller electrically connected to the driver circuit; and
   a terminal portion electrically connected to a flexible printed circuit,
   wherein the first electrode and the third electrode are electrically connected to the terminal portion by a common wiring,
   wherein the controller is configured to select a first driving mode and a second driving mode,
   wherein the controller is configured to rewrite an image data input to the pixel every first period in the first driving mode,
   wherein the controller is configured to stop supplying of control signals to the driver circuit for a second period in the second driving mode,
   wherein the second period is longer than the first period, and
   wherein the first electrode and the third electrode are supplied with a same potential.

10. The liquid crystal display device according to claim 9, wherein the first driving mode is a mode for displaying a moving image, and
    wherein the second driving mode is a mode for displaying a still image.

11. The liquid crystal display device according to claim 9, further comprising a transistor electrically connected to the second electrode,
    wherein a channel of the transistor comprises an oxide semiconductor.

12. The liquid crystal display device according to claim 11, wherein a band gap of the oxide semiconductor is greater than or equal to 3.0 eV.

13. The liquid crystal display device according to claim 11, wherein an off-state current of the transistor per micrometer of a channel width is lower than or equal to 100 zA/μm.

14. The liquid crystal display device according to claim 9, wherein a polarity of a signal input to the pixel is inverted every first period in the first driving mode.

15. The liquid crystal display device according to claim 9, wherein the pixel portion comprises a plurality of pixels,
    wherein the first electrode and the plurality of pixels overlap each other, and
    wherein the second electrode and the plurality of pixels overlap each other.

16. An electronic device comprising the liquid crystal display device according to claim 9 in a display portion.

* * * * *